(12) United States Patent  
Zalewski

(10) Patent No.: US 8,269,822 B2  
(45) Date of Patent: Sep. 18, 2012

(54) DISPLAY VIEWING SYSTEM AND METHODS FOR OPTIMIZING DISPLAY VIEW BASED ON ACTIVE TRACKING

(75) Inventor: Gary M. Zalewski, Oakland, CA (US)

(73) Assignee: Sony Computer Entertainment America, LLC, Foster City, CA (US)

( * ) Notice: Subject to any disclaimer, the term of this patent is extended or adjusted under 35 U.S.C. 154(b) by 385 days.

(21) Appl. No.: 12/503,846

(22) Filed: Jul. 16, 2009

(65) Prior Publication Data

US 2010/0007582 A1    Jan. 14, 2010

Related U.S. Application Data

(63) Continuation-in-part of application No. 11/732,830, filed on Apr. 3, 2007.

(51) Int. Cl.
*H04N 13/04* (2006.01)
(52) U.S. Cl. ........................................ 348/56
(58) Field of Classification Search .................... 348/56
See application file for complete search history.

(56) References Cited

U.S. PATENT DOCUMENTS

| 5,821,989 | A | * | 10/1998 | Lazzaro et al. | 348/56 |
| 5,993,004 | A | * | 11/1999 | Moseley et al. | 353/8 |
| 6,115,177 | A | * | 9/2000 | Vossler | 359/465 |
| 6,956,576 | B1 | * | 10/2005 | Deering et al. | 345/475 |
| 6,985,290 | B2 | * | 1/2006 | Putilin et al. | 359/462 |
| 7,796,134 | B2 | * | 9/2010 | Vesely et al. | 345/427 |
| 2006/0061652 | A1 | | 3/2006 | Sato et al. | 348/53 |
| 2008/0225041 | A1 | * | 9/2008 | El Dokor et al. | 345/419 |
| 2009/0066863 | A1 | | 3/2009 | Chen | 349/13 |

FOREIGN PATENT DOCUMENTS

| DE | 195 33 767 A1 | 3/1997 |
| JP | 195 33 767 A1 | 3/1997 |
| JP | 9-135400 | 5/1997 |

* cited by examiner

*Primary Examiner* — Larry Donaghue
(74) *Attorney, Agent, or Firm* — Martine Penilla Group, LLP

(57) ABSTRACT

An apparatus for interfacing with a display screen is provided. The apparatus includes a frame. The frame includes (a) a pair of shutter lenses, (b) a light coupled to the frame; and (b) a circuit integrated with the frame to control the pair of shutter lenses and control the light coupled to the frame. The circuit is configured to communicate with a display device to enable synchronization of the shutter lenses and the display device. The light is analyzed to determine position of the frame relative to the display device, and the position is used to cause an adjustment in display output when viewed from the perspective of the position of the frame.

17 Claims, 27 Drawing Sheets

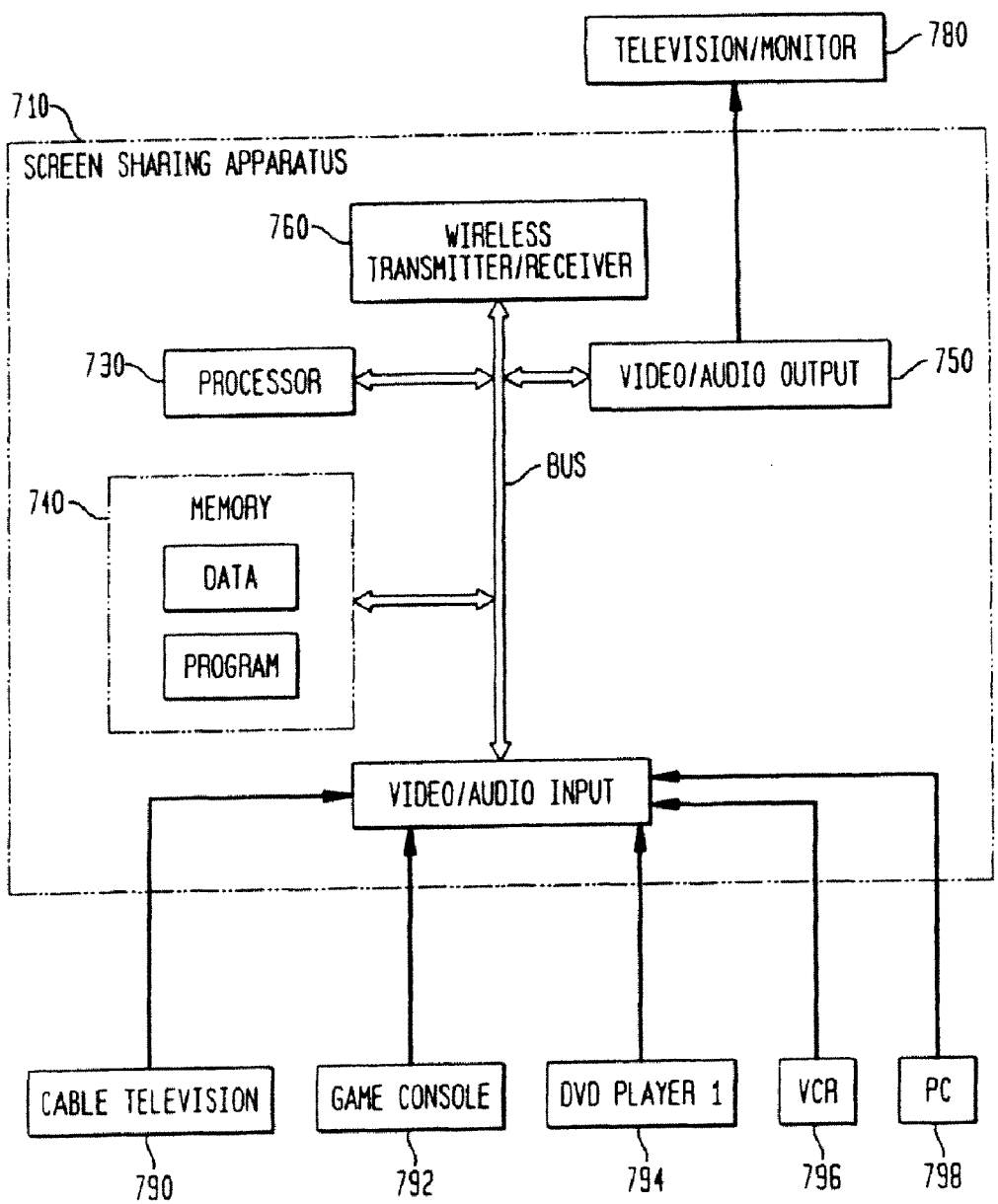

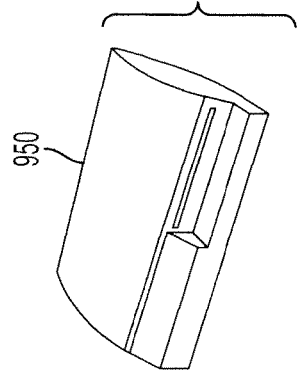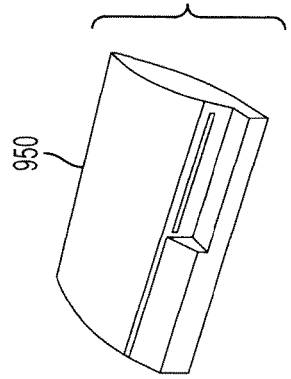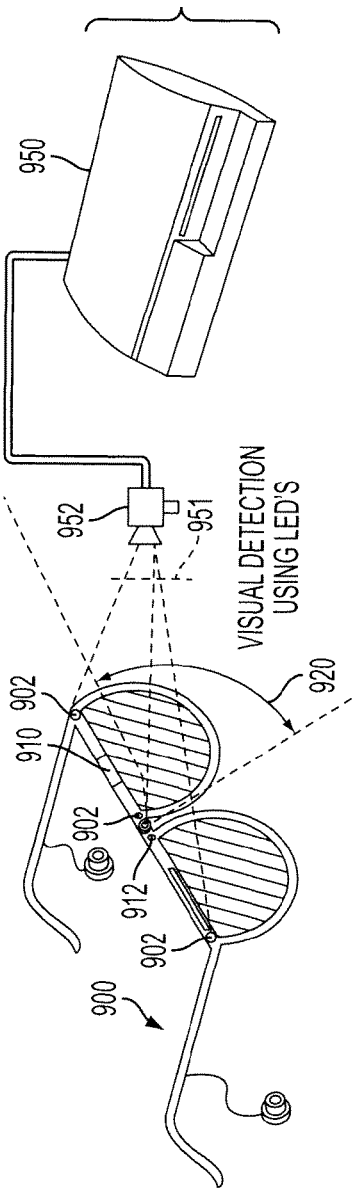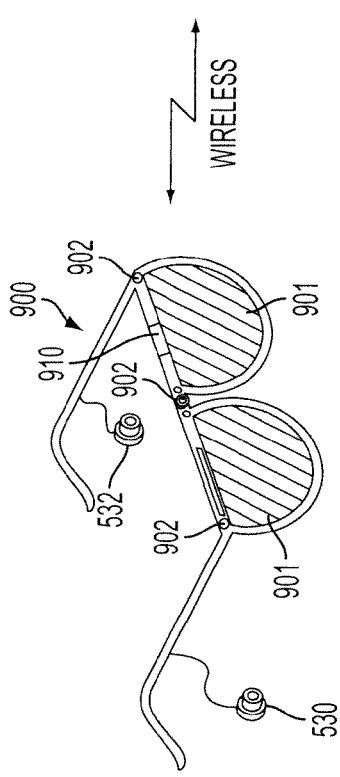

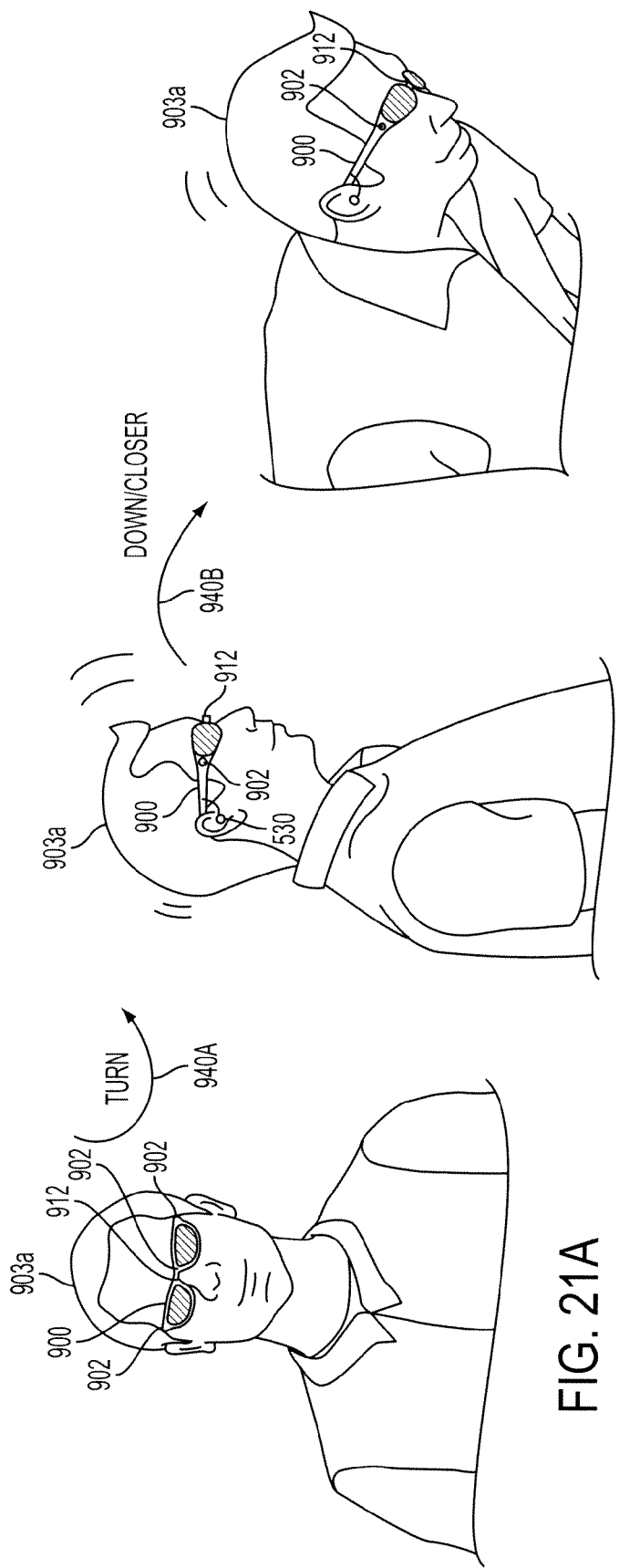

DISPLAY VIEWING SYSTEM AND METHODS FOR OPTIMIZING DISPLAY VIEW BASED ON ACTIVE TRACKING

CLAIM OF PRIORITY

This application is a continuation in part (CIP) of U.S. patent application Ser. No. 11/732,830 entitled, "Screen Sharing Method and Apparatus", filed on Apr. 3, 2007, having inventors Heinrich Shih Ko, Jae Won Paik, and Gary M. Zalewski, which is herein incorporated by reference.

RELATED APPLICATIONS

This application is related to the following:

U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003;

U.S. patent application Ser. No. 10/759,782, entitled "METHOD AND APPARATUS FOR LIGHT INPUT DEVICE", filed on Jan. 16, 2004;

U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005;

U.S. patent application Ser. No. 11/381,725, to Xiao Dong Mao, entitled "METHODS AND APPARATUS FOR TARGETED SOUND DETECTION", filed on May 4, 2006;

U.S. patent application Ser. No. 11/381,724, to Xiao Dong Mao, entitled "METHODS AND APPARATUS FOR TARGETED SOUND DETECTION AND CHARACTERIZATION", filed on May 4, 2006;

U.S. patent application Ser. No. 11/381,721, to Xiao Dong Mao, entitled "SELECTIVE SOUND SOURCE LISTENING IN CONJUNCTION WITH COMPUTER INTERACTIVE PROCESSING", filed on May 4, 2006;

U.S. patent application Ser. No. 11/429,133, to Richard Marks et al., entitled "SELECTIVE SOUND SOURCE LISTENING IN CONJUNCTION WITH COMPUTER INTERACTIVE PROCESSING", filed on May 4, 2006;

U.S. patent application Ser. No. 11/429,414, to Richard Marks et al., entitled "Computer Image and Audio Processing of Intensity and Input Devices for Interfacing With A Computer Program", filed on May 4, 2006; U.S. patent application Ser. No. 11/382,031, entitled "MULTI-INPUT GAME CONTROL MIXER", filed on 6 May 2006;

U.S. patent application Ser. No. 11/382,032, entitled "SYSTEM FOR TRACKING USER MANIPULATIONS WITHIN AN ENVIRONMENT", filed on 6 May 2006;

U.S. patent application Ser. No. 11/382,033, entitled "SYSTEM, METHOD, AND APPARATUS FOR THREE-DIMENSIONAL INPUT CONTROL", filed on 6 May 2006;

U.S. patent application Ser. No. 11/382,035, entitled "INERTIALLY TRACKABLE HAND-HELD CONTROLLER", filed on 6 May 2006;

U.S. patent application Ser. No. 11/382,036, entitled "METHOD AND SYSTEM FOR APPLYING GEARING EFFECTS TO VISUAL TRACKING", filed on May 6, 2006;

U.S. Pat. No. 7,352,359, entitled "METHOD AND SYSTEM FOR APPLYING GEARING EFFECTS TO INERTIAL TRACKING", issued on Apr. 1, 2008;

U.S. Pat. No. 7,352,358, entitled "METHOD AND SYSTEM FOR APPLYING GEARING EFFECTS TO ACOUSTICAL TRACKING", issued on Apr. 1, 2008;

U.S. patent application Ser. No. 11/382,034 entitled "SCHEME FOR DETECTING AND TRACKING USER MANIPULATION OF A GAME CONTROLLER BODY", filed on May 6, 2006;

U.S. patent application Ser. No. 11/382,037, entitled "SCHEME FOR TRANSLATING MOVEMENTS OF A HAND-HELD CONTROLLER INTO INPUTS FOR A SYSTEM", filed on May 6, 2006;

U.S. patent application Ser. No. 11/382,043, entitled "DETECTABLE AND TRACKABLE HAND-HELD CONTROLLER", filed on May 7, 2006;

U.S. patent application Ser. No. 11/382,043, entitled "METHOD FOR MAPPING MOVEMENTS OF A HAND-HELD CONTROLLER TO GAME COMMANDS", filed on May, 7, 2006, and U.S. patent application Ser. No. 12/050,128 entitled "CONTROLLER WITH AN INTEGRATED CAMERA AND METHODS FOR INTERFACING WITH AN INTERACTIVE APPLICATION", filed on Mar. 17, 2008.

Each and every application identified above is herein incorporated by reference for all purposes.

BACKGROUND

The present invention relates to systems that incorporate a display, such as are used as television or video monitors, computer monitors, or game system displays.

Presently, most displays are only able to provide one video, television program, game, etc. to all viewers of that display. As an example, all players of a given video game view the same images on the monitor, and as a result, different visual information cannot be provided to different players unless a more complex and more expensive type of display is used, such as a head mounted monitor.

Similarly, present displays that can provide more than one television program, game, or video at the same time require all viewers to view images from each of the displayed television programs, games, or videos, such as by splitting the display screen image or by providing a picture within a picture. Moreover, the audio portion of only one such television program, game, or video can be provided at a time for that audio portion to be audible.

It is therefore desirable to provide a "screen sharing" system in which two or more viewers using the same display can each be provided with different images on the display in a manner that does not require each viewer to also view the images intended for another viewer. It is also desirable to provide system that may be configured to provide each user who is "sharing" a screen with another user the ability to receive the audio portion associated with the images or content being viewed by that user.

SUMMARY

An apparatus for interfacing with a display screen is provided. The apparatus includes a frame. The frame includes (a) a pair of shutter lenses, (b) a light coupled to the frame; and (b) a circuit integrated with the frame to control the pair of shutter lenses and control the light coupled to the frame. The circuit is configured to communicate with a display device to enable synchronization of the shutter lenses and the display device. The light is analyzed to determine position of the frame relative to the display device, and the position is used to cause an adjustment in display output when viewed from the perspective of the position of the frame.

The present invention further provides a system in which a display alternately presents images from at least two video feeds and in which a synchronized, shuttered filter device is used that only permits the viewing of images from one of the video feeds. A "video feed" may be represented as any video content, video stream, channel, game output, cable channel, video output from a consumer electronic device, DVR, DVD player, motion picture, left parallax video, right parallax video, etc. "Video feeds" may be sourced from single or multiple channels. Video feeds may be sourced through one or more physical cables or through one or more internal buses or through any known means for sourcing video images, etc.

An apparatus for interfacing with a display screen is provided. The apparatus includes a frame. The frame includes (a) a pair of shutter lenses, (b) a light coupled to the frame; and (b) a circuit integrated with the frame to control the pair of shutter lenses and control the light coupled to the frame. The circuit is configured to communicate with a display device to enable synchronization of the shutter lenses and the display device. The light is analyzed to determine position of the frame relative to the display device, and the position is used to cause an adjustment in display output when viewed from the perspective of the position of the frame.

"Screen sharing" as described herein may generally refer to a time-sharing arrangement where a single user can view 3D content or multiple users can simultaneously view programming on a single television display using the full screen dimensions and wearing shutter glasses to coordinate each user view of programming sequences.

According to an aspect of the invention, respective video feeds are provided to at least two viewers using a common display. The display is controlled to alternately display an image from a first video feed and an image from a second video feed. A first shuttered filter is synchronized to the display such that the first filter is shuttered when the second video feed image is displayed, and a second shuttered filter is synchronized to the display such that the second filter is shuttered when the first video feed image is displayed. As a result, only the first video feed image is provided to a first viewer using the first shuttered filter, and only the second video feed image is provided to a second viewer using the second shuttered filter.

The present invention can apply to solve the issue of two-player split screen game where traditional screens are divided in two portions and players sit side-by-side and play a game watching one screen with both player perspectives each occupying one half of the screen. The present invention can be configured to enable both players to see the full screen dimension of their game perspective. It also provides for less distraction as the present invention avoids the need for one player to see the other player's perspective on screen. Therefore, according to another aspect of the invention, a video game is provided to at least two players using a common display. The display is controlled to alternately display a full-screen image according to a first perspective of a video game and a full-screen image according to a second perspective of the video game. A first pair of LCD shutter glasses is synchronized to the display such that a first player using the first pair of LCD shutter glasses can play the video game while viewing the video game from the first perspective only. A second pair of LCD shutter glasses is synchronized to the display such that a second player using the second pair of LCD shutter glasses can play the video game while viewing the video game from the second perspective only.

According to a further aspect of the invention, a video game is provided to a first viewer and a video program is concurrently provided to a second viewer using the same display. The display is controlled to alternately display an image from the video game and an image from the video program. A first pair of LCD shutter glasses is synchronized to the display such that a first viewer using the first pair of LCD shutter glasses can play the video game only. A second pair of LCD shutter glasses is synchronized to the display such that a second viewer using the second pair of LCD shutter glasses can view the video program only.

The foregoing aspects, features and advantages of the present invention will be further appreciated when considered with reference to the following detailed description and accompanying drawings.

BRIEF DESCRIPTION OF THE DRAWINGS

FIG. 7 is a system diagram of a screen sharing apparatus, in communication with a television or monitor and multiple inputs, in accordance with an aspect of the invention.

FIGS. 20A-20F define embodiments of tracking apparatus and methods, for use with shuttering LCD glasses.

FIGS. 21A-21C illustrate examples of glasses having lights for tracking.

DETAILED DESCRIPTION

The present invention provides various embodiments, in which shuttered LCD glasses are used. Embodiments enable use of a single monitor to present respective video feeds to two or more viewers in a manner that allows each viewer to only see the images from the video feed intended for that viewer. The invention also allows each viewer to only hear the sounds associated with that video feed. Embodiments also provide for tracking of a user through the tracking of glasses. When glasses are tracked, the tracking information can be used to make adjustments and optimizations in the parallax, such that the display screen is optimized for a user based on his/her position.

I. Shuttering Filtering

Figure 1:
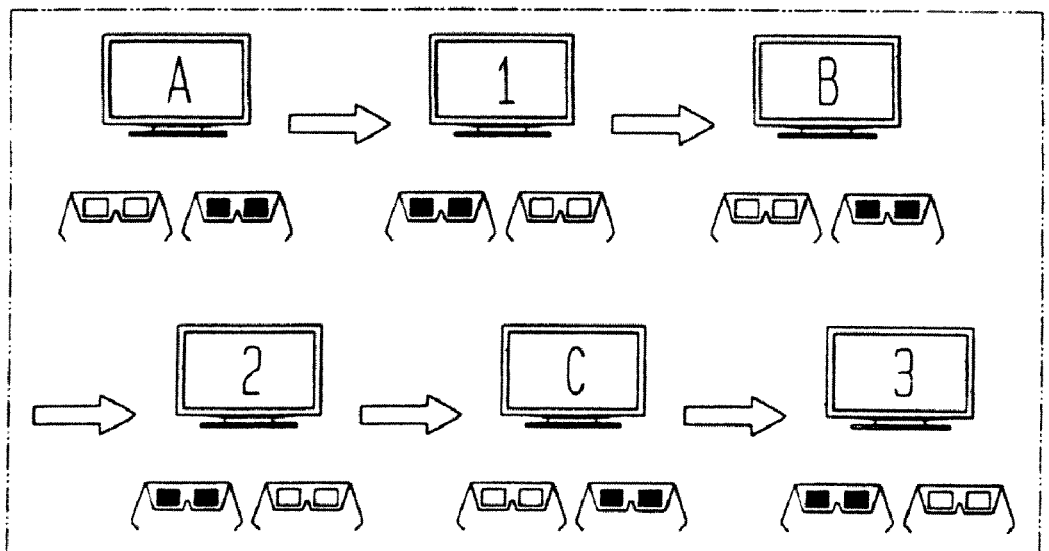
FIG. 1 is a diagram depicting an example of a display and associated pairs of LCD shutter glasses that operate in accordance with an aspect of the invention.

FIG. 1 illustrates an example of the invention in which a first video feed comprised of frames A, B, C, . . . and a second video feed comprised of frames 1, 2, 3, . . . are shown on the same monitor. The monitor alternately displays an image from each video feed, resulting in the displayed sequence of images A, 1, B, 2, C, 3, . . . shown in the upper portion of FIG. 2.

A first shuttered filter, such as the leftmost of the two pairs of LCD shutter glasses shown repeatedly in FIG. 1, is synchronized to the frames of first video feed. The first shuttered filter is open when the frames of the first video feed are shown on the monitor and is shuttered when the frames of the second video feed are shown on the monitor. An individual viewing the monitor through the first shuttered filter, e.g., by wearing the leftmost pair of LCD shutter glasses, would therefore only see the frames of the first video feed and would not see the frames of the second video feed, as shown in the leftmost bottom portion of FIG. 2.

A second shuttered filter, such as the rightmost of the two pairs of LCD shutter glasses repeatedly shown in FIG. 1, is synchronized to the frames of the second video feed. The second shuttered filter is open when the frames of the second video feed are shown on the monitor and is shuttered when the frames of the first video feed are shown on the monitor. Thus, an individual viewing the monitor through the second shuttered filter, e.g., by wearing the rightmost pair of LCD shutter glasses, would therefore only see the frames of the second video feed and would not see the frames of the first video feed, as shown in the rightmost bottom portion of FIG. 2.

The lenses of a pair of LCD shutter glasses are preferably either both open or both shuttered at the same time and are synchronized to the images from one of the displayed video feeds to allow the wearer to view the images from that video feed.

Each viewer may also be provided with a speaker that emits only the audio signals for the video feed provided to that viewer. A first audio signal associated with the first video feed is provided to the viewer of the first video feed, and a second audio signal associated with the second video feed is provided to the viewer of the second video feed. As an example, each pair of the LCD shutter glasses shown in FIGS. 1 and 2 may be provided with a headphone or earphone that permits the wearer to hear the sounds for the video feed being viewed by the wearer without interference from the sounds provided to a viewer of another video feed.

Figure 5:
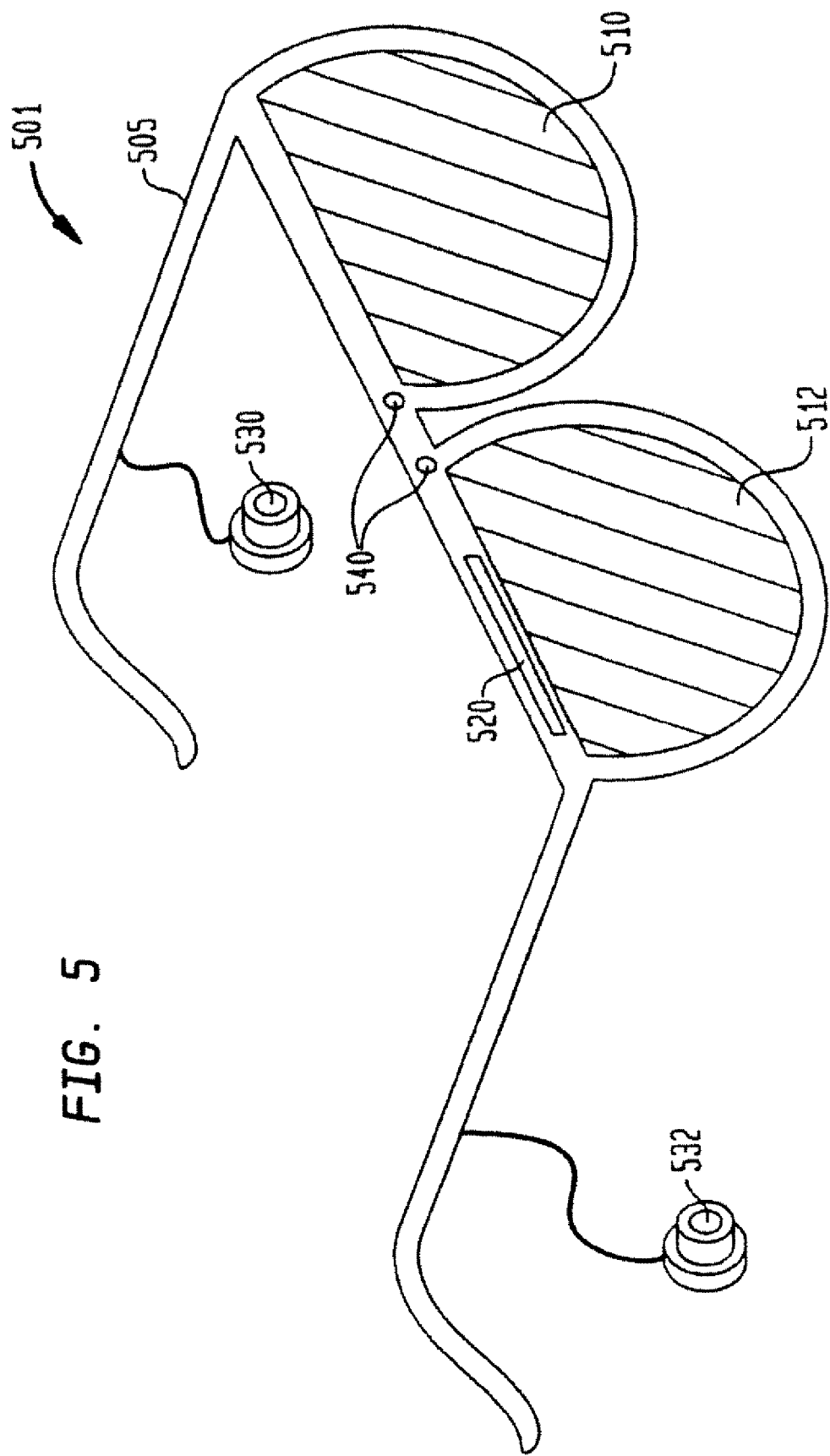
FIG. 5 is an isometric view of glasses and headphones in accordance with an aspect of the invention.

Glasses 501 in accordance with an aspect of the present invention are shown in FIG. 5. The glasses may include a frame 505 for holding a left LCD eyeglass lens 510 and a right LCD eyeglass lens 512. As noted above, each eyeglass lens 510 and 512 can be rapidly and selectively blackened so as to prevent the wearer from seeing through the lens. Left and right earphones 530 and 532 are also preferably connected to the frame 505. An antenna 520 for sending and receiving wireless information may also be included in or on the frame 505. The glasses may be tracked via any means to determine if the glasses are looking toward the screen. For example, the front of the glasses may also include one or more photo detectors 540 for detecting the orientation of the glasses towards the monitor.

The alternating displays of images from the video feed can be provided using various known techniques. It is preferred that screen 410 be configured to operate in a progressive scan mode for each video feed that is shared on the screen. However the present invention may also be configured to work with interlaced video, as described. For a standard television monitor, such as those using an interlaced NTSC or PAL format, the images of the two video feeds may be interlaced and the lines of an image from one video feed may be interleaved with the lines of an image from the other video feed. For example, the odd-numbered lines taken from an image from the first video feed are displayed, and then the even-numbered lines taken from an image from the second video feed are displayed.

For applications in which the images of one or more of the video feeds are to provide the appearance of continuous motion, the frequency at which the images of both video feeds are shown on the monitor must be greater than that which the human eye can perceive. Thus, the images from video feeds presented using interlacing/interleaving may be prone to flickering or poor resolution. As an alternative, the images from the two video feeds may be alternately presented on the monitor by flipping between two pages of video memory that store the two images, known as page flipping. Also, a progressive scanning monitor may be used in combination with page flipping.

Figure 6:
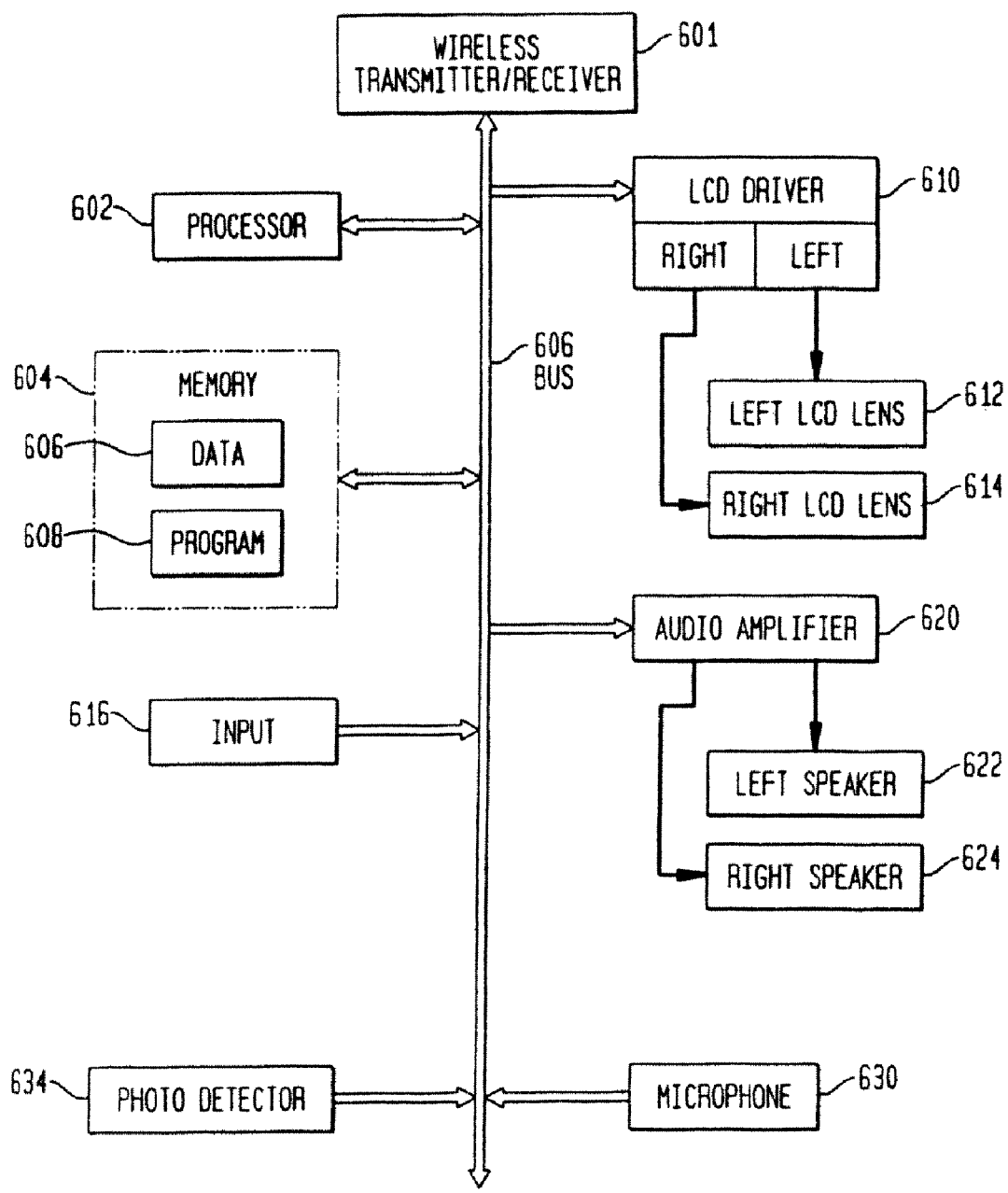
FIG. 6 is a system diagram of glasses in accordance with an aspect of the invention.

A system diagram of glasses in accordance with an aspect of the invention is shown in FIG. 6. The glasses may include a processor 602 which executes instructions from program 608 stored in memory 604. Memory 604 may also store data to be provided to, or output from, processor 602 as well as any other storage retrieval/storage element of the glasses. Processor 602, memory 604 and the other elements of the glasses may communicate with one another over a bus 606. Such other elements may include an LCD Driver 610 which provides a driver signal which selectively shutters left and right LCD lens 612 and 614. The LCD Driver may shutter each left and right LCD lens individually and at different times and durations, or together at the same time and duration.

The frequency at which the LCD lens are shuttered may be stored in advance in the glasses (e.g., based on the known frequencies of NTSC). Alternatively, the frequency may be selected via means of user input 616 (e.g., knobs or buttons to adjust or enter the desired frequency). Yet further, the desired frequency as well as the initial shutter start time, or other information indicating the time period during which the LCD lenses should be shuttered or not regardless of whether such time periods are at a set frequency and duration, may be transmitted to the glasses via wireless transmitter receiver 601 or any other input element. The wireless transmitter/receiver 601 may comprise any wireless transmitter, including a Bluetooth transmitter/receiver.

Audio amplifier 616 may also receive information from the wireless transmitter/receiver 601, namely, the left and right channels of audio to be provided to left speaker 622 or right speaker 624. The glasses may also include a microphone 630. The microphone 630 may be used in connection with games providing for voice communication; the voice signals may be transmitted to a game console or another device via wireless transmitter/receiver 601.

The glasses may also include one or more photo detectors 634. The photo detectors may be used to determine whether the glasses are oriented towards the monitor. For example, the photo detectors may detect the intensity of light hitting the photo detectors and transmit the information to processor 602. If the processor detects a substantial drop in light intensity, which may relate to the user looking away from the monitor, the processor may cease the shuttering of the lenses. Other methods of determining whether the glasses (and thus user) are oriented towards the monitor may also be used. For example, one or more cameras in lieu of photo detectors may be used and the captured images examined by processor 602 to determine whether the glasses are oriented towards the monitor. Just a few possible embodiments of using such a camera may include checking contrast levels to detect whether the camera is pointed at the monitor or attempting to detect brightness test patterns on the monitor. The device providing multiple feeds to the monitor may indicate the presence of such test patterns by transmitting information to processor 602 via wireless transmitter/receiver 601.

A system diagram of one aspect of a screen sharing apparatus 710 which provides the video to be displayed is illustrated in FIG. 7. A video/audio input 720 accepts two or more video and audio inputs such as but not limited to, and preferably in any combination, from: a cable television set top box 790, game console 792, DVD player 794, VCR 796 and a personal computer 798. Though it should be recognized for the purposes of this invention that a single video stream may represent two "video feeds" or video inputs. The single video stream can be a time division multiplexed sequence of video frames characterized by two or more video feeds or inputs. Also, the video inputs do not need to be sourced from multiple devices. Rather, one device may be capable of presenting two or more video inputs or video feeds.

With respect to the continuing example, A processor 730 retrieves and stores data in memory 740 and provides signals to the other elements of the screen sharing apparatus. Video/audio output 750 multiplexes a selected number of the video signals from the video inputs in a manner such that two or more of the video signals follow one another sequentially in rapid succession on a single video output signal to the television or monitor 780 (it being understood that such single video output signal may actually comprise multiple signals, including composite or color signals). Information related to the multiplexed signals may be transmitted via wireless transmitter/receiver 760 to the glasses. Such information may include the number of video inputs selected for multiplexing, the frequency of the multiplexing, the time at which a particular video signal is sent to television or monitor 780, an identifier of which video signal is being displayed at a particular time, and other information. The audio signal from the audio/video inputs 790-798 may also be transmitted wirelessly from the screen sharing apparatus 710 to the glasses.

Figure 8A:
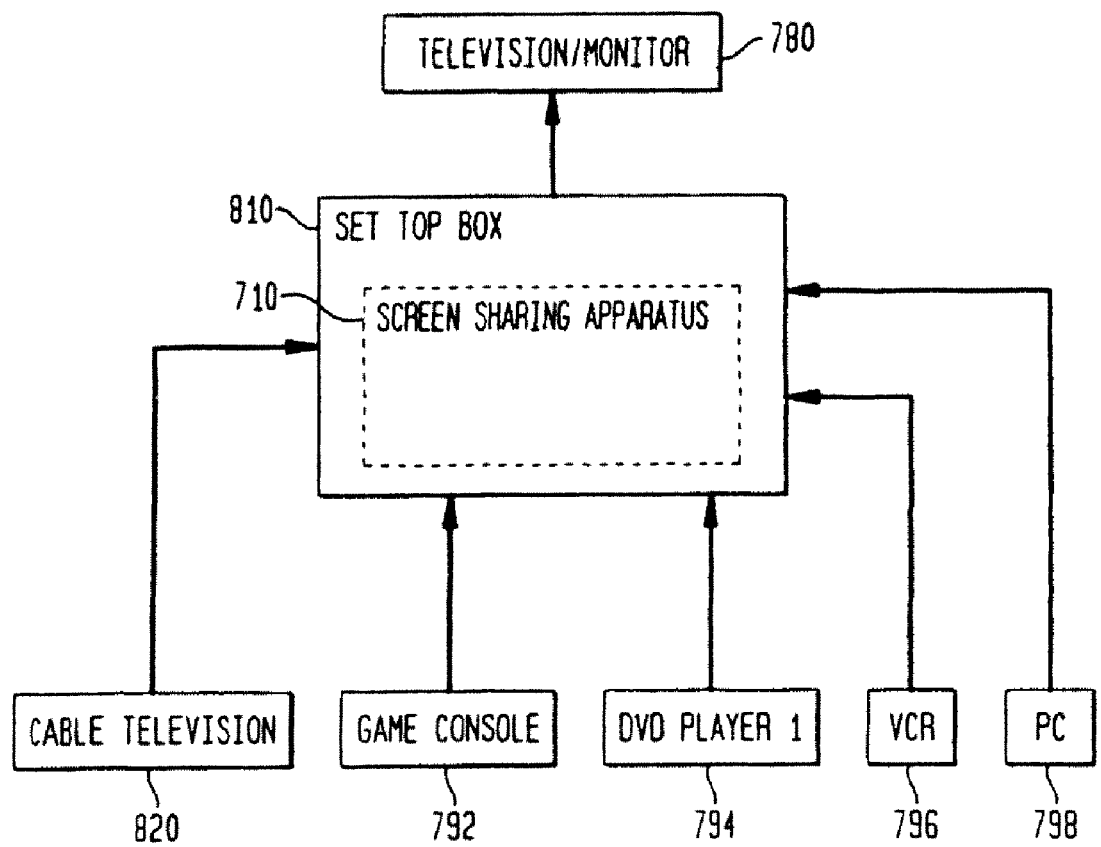
FIGS. 8A and 8B are system diagrams of a screen sharing apparatus contained in a set top box and game console, respectively.
Figure 8B:
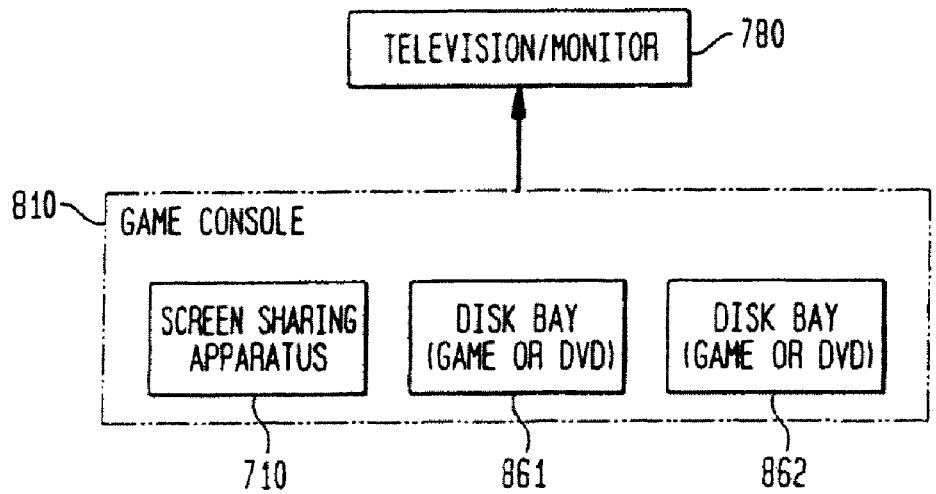

Although the screen sharing apparatus 710 is schematically illustrated as being separate from the television 780 and video inputs in FIG. 7, the apparatus may be located in a wide variety of devices. For example and as illustrated in FIG. 8A, the screen sharing apparatus 710 may be embedded in a set top box having multiple inputs. As shown in FIG. 8B, the screen sharing apparatus may also be contained in a game console having multiple internal audio/video sources, such as two disk bays 861, 862 (each capable of rendering content from a game or DVD).

Figure 2:
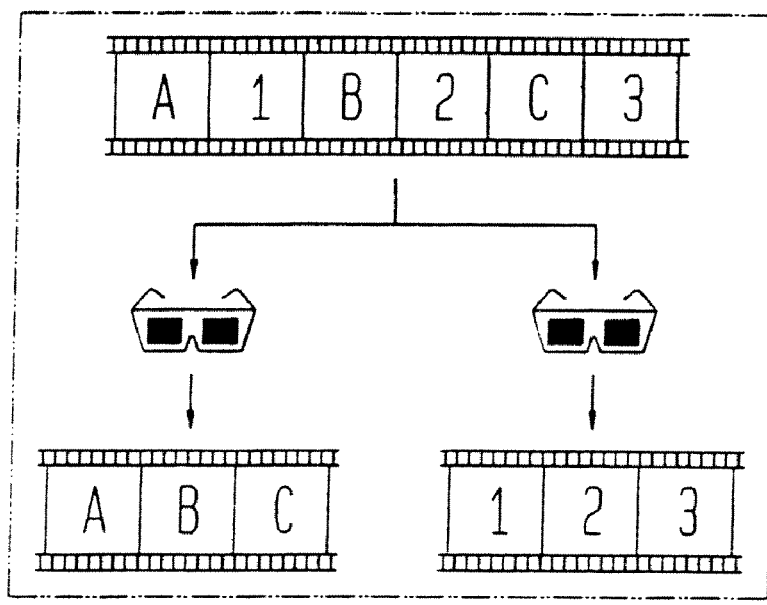
FIG. 2 is a diagram showing the sequence of frames presented by the display of FIG. 1 and showing the frames viewed by each wearer of a given pair of the LCD shutter glasses in accordance with an aspect of the invention.

Though only two video feeds and two shuttered filters are shown in FIGS. 1 and 2, the invention is also applicable to arrangements in which the monitor shows more than two video feeds and in which more than two synchronized, shuttered filters are used to allow viewing of each of the video feeds.

Figure 3A:
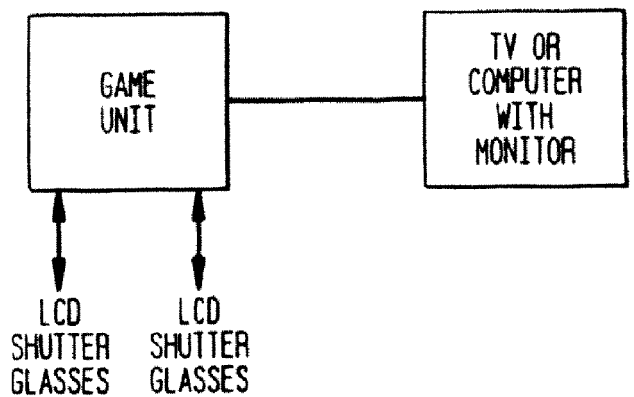
FIGS. 3A-3C are diagrams illustrating various embodiments of a system in accordance with an aspect of the invention.

FIG. 3A illustrate an embodiment of the invention used in a video game system. A game unit stores the software required for playing the video game and also controls the images delivered to the monitor of a television set or computer. The game unit provides two video feeds to the monitor and controls the monitor to alternately display images from the two video feeds, as described above with regards to FIGS. 1 and 2. The game unit is also connected to two or more pairs of LCD shutter glasses and synchronizes the shutter operation of each given pair of LCD shutter glasses to one of the video feeds. The connection between the game unit and the pairs of LCD shutter glasses may be a physical connection or may be a wireless connection, such as using the Bluetooth communication protocol.

Figure 9:
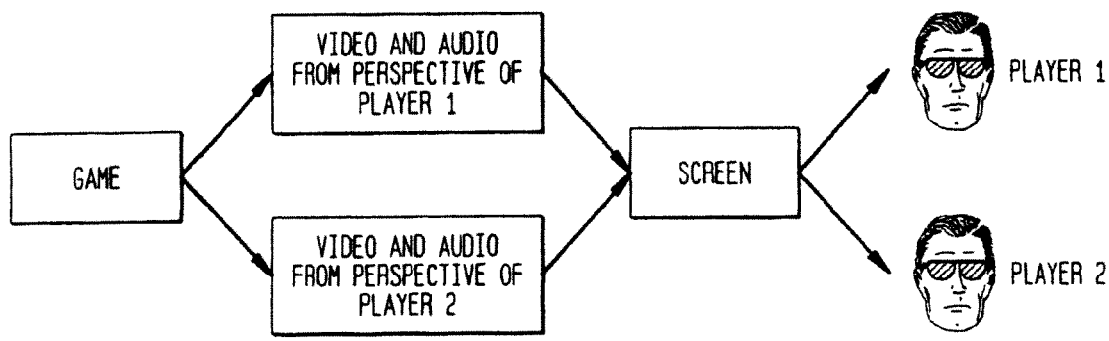
FIG. 9 is a functional diagram of audio/video content being simultaneously provided to multiple users in accordance with an aspect of the invention.

The embodiment shown in FIG. 3A, and FIG. 9, thus allows each player of a video game to participate in the game from that player's perspective. One of the video feeds provides a first player with a particular view of the activities of the game and may include visual information not provided to the other player. In a similar manner, the other video feed provides a second player with a different view of the same game that is suited to that player. Each player wears a pair of LCD shutter glasses that is synchronized to the images of one of the video feeds and only allows the player to view images of that video feed. Also, if headphones are provided for each player, the first and second players may each be provided with sounds and/or audio instructions not provided to the other player.

Figure 10:
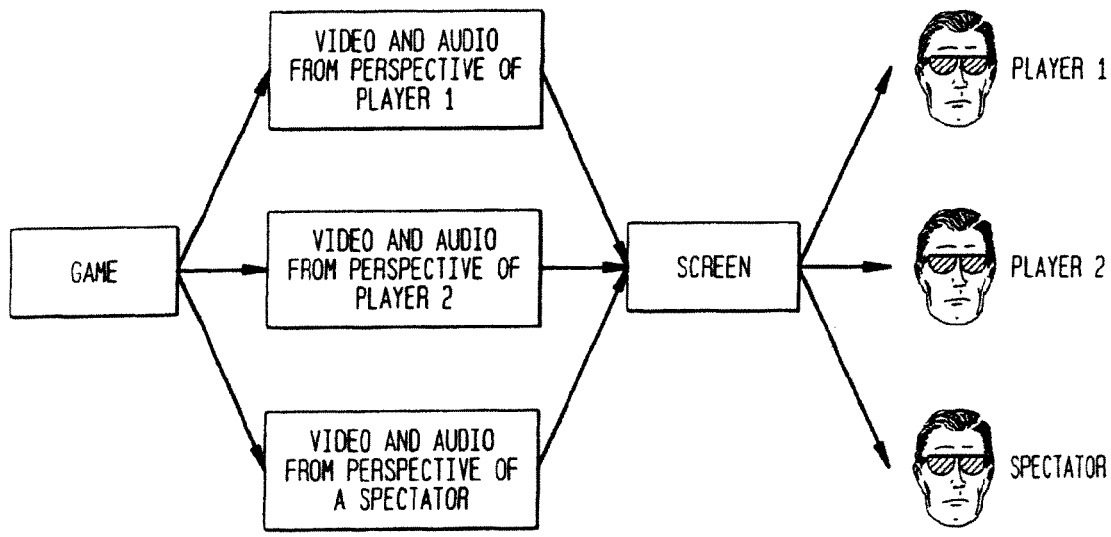
FIG. 10 is a functional diagram of audio/video content being simultaneously provided to multiple users in accordance with an aspect of the invention.

As a variation of this example and shown in FIG. 10, a third pair of LCD shutter glasses is added and is controlled by the game unit to provide the wearer with a spectator mode of the video game in which both views of the game may be seen. The third pair of LCD shutter glasses, for example, may provide one of the pair of shutter glasses with one of the video feeds and provide the other of the pair of shutter glasses with another of the video feeds in manner similar to that used in a 3D application, resulting in a combined view of the images from two video feeds.

Figure 12:
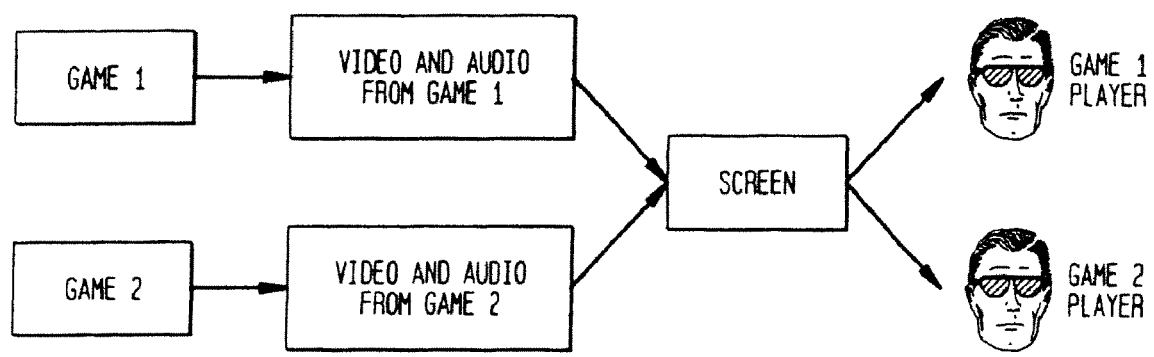
FIG. 12 is a functional diagram of different game content being provided to multiple users in accordance with an aspect of the invention.

As another example, and as illustrated in FIG. 12, the two video feeds may provide images of two respective video games. The game unit controls the monitor to alternately provide images from each perspective of the two video games and synchronizes the two pairs of LCD shutter glasses such that a particular pair of the LCD shutter glasses only provides a view of one of the video games. Using this arrangement, the two video games may be played concurrently by different players using the same game unit and monitor.

Figure 3B:
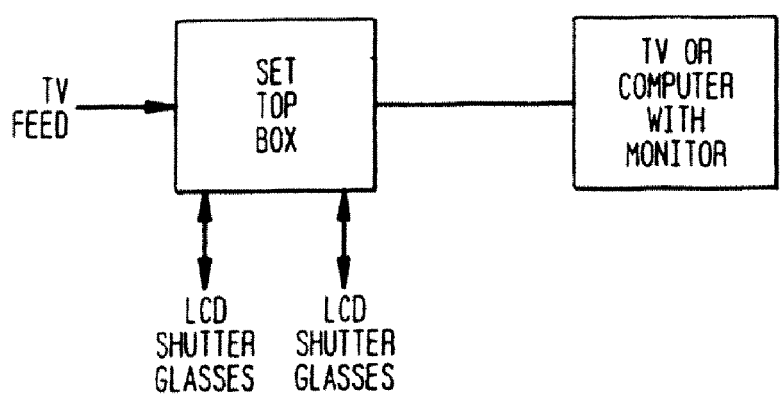
Figure 13:
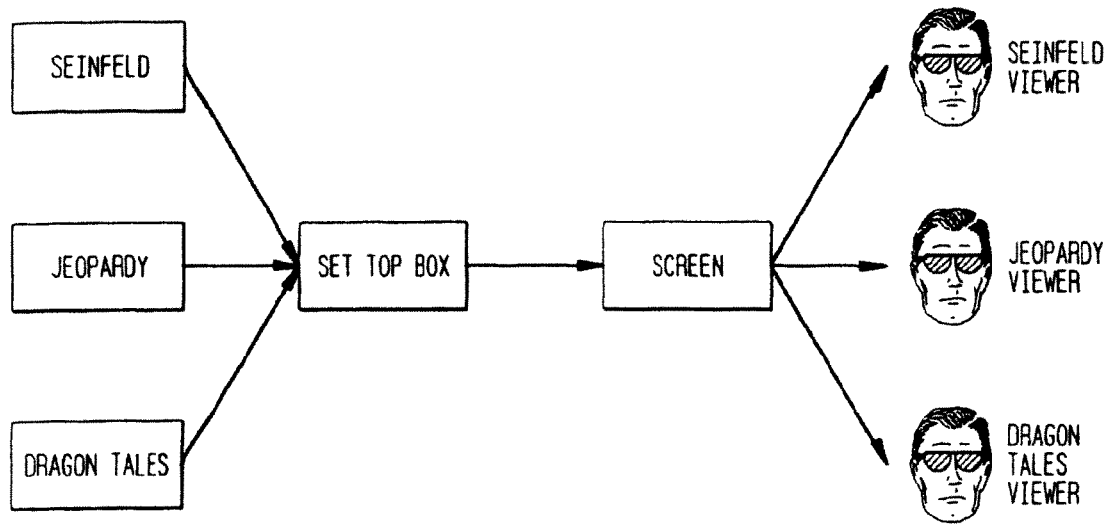
FIG. 13 is a functional diagram of different television channels being provided to multiple users in accordance with an aspect of the invention.

FIG. 3B and FIG. 13 show another embodiment of the invention in which a set top box receives various television channels (such as three channels showing the shows Seinfeld, Jeopardy and Dragon Tales, respectively) and/or videos and controls the monitor to alternately display images from each television programs and/or video. The set top box controls each of the LCD shutter glasses to allow its wearer to view only one of the programs and/or videos. The inclusion of headphones also allows each viewer to hear the audio portion of only the program or video being viewed. Using this arrangement, two or more individuals can watch and hear different television programs and/or videos at the same time and while in the same room and viewing the same monitor.

The invention may be used with any number of video feeds. For example, the set top box shown in FIG. 3B may be configured to receive four or more video feeds that are cyclically displayed on the monitor, and each of the video feeds is associated with one of four different pairs of LCD shutter glasses controlled by the set top box and synchronized to the display of its associated video feed.

Figure 3C:
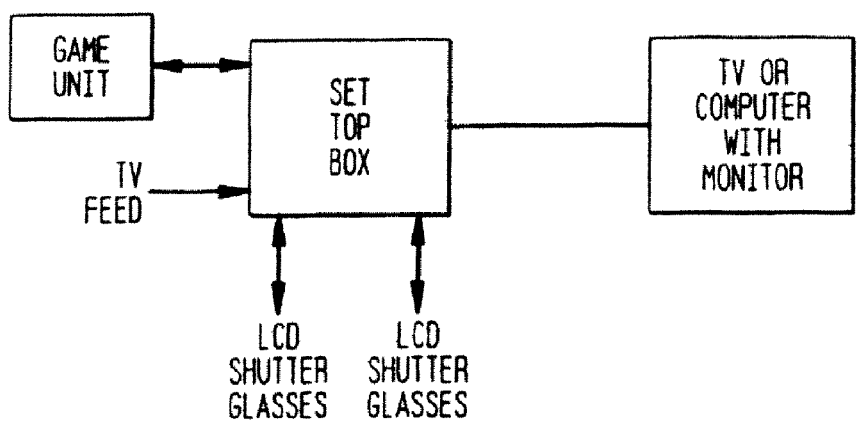
Figure 14:
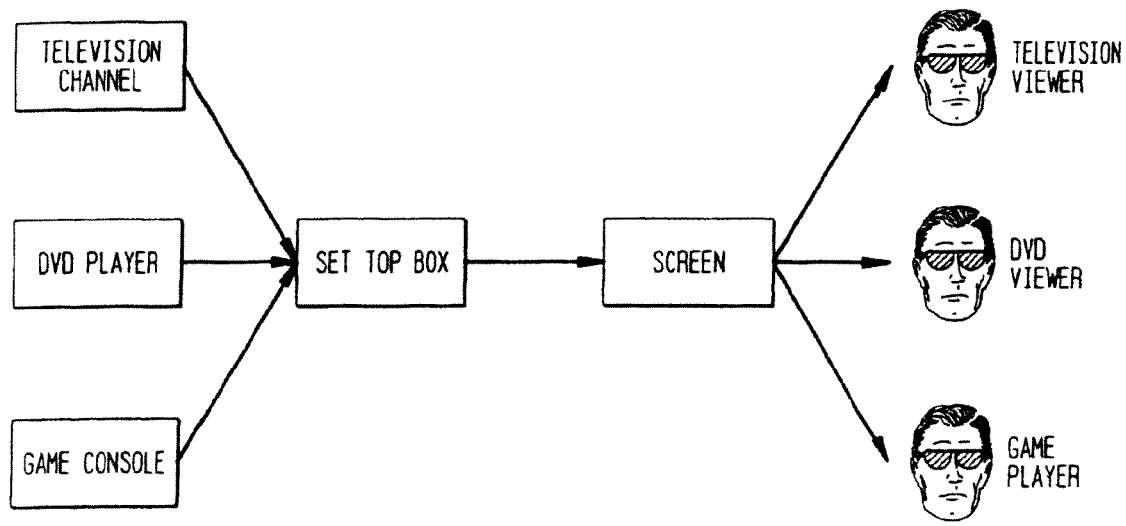
FIG. 14 is a functional diagram of different audio/visual content being provided to multiple users in accordance with an aspect of the invention.

FIG. 3C and FIG. 14 show a further embodiment of the invention in which a set top box receives various television channels and/or videos and is also connected to a game unit from which it receives a video game feed. The set top box controls the monitor to alternately display images from the video game and images from the television program or video. The control unit also synchronizes the shuttering of one of the pairs of LCD shutter glasses to permit its wearer to view the television program or video and synchronizes the shuttering of the other pair of LCD shutter glasses to permit its wearer to concurrently play the video game. Using this arrangement, an individual can watch and hear a television program or a video at the same time that another individual plays a video game with both individuals viewing the same monitor.

Figure 15:
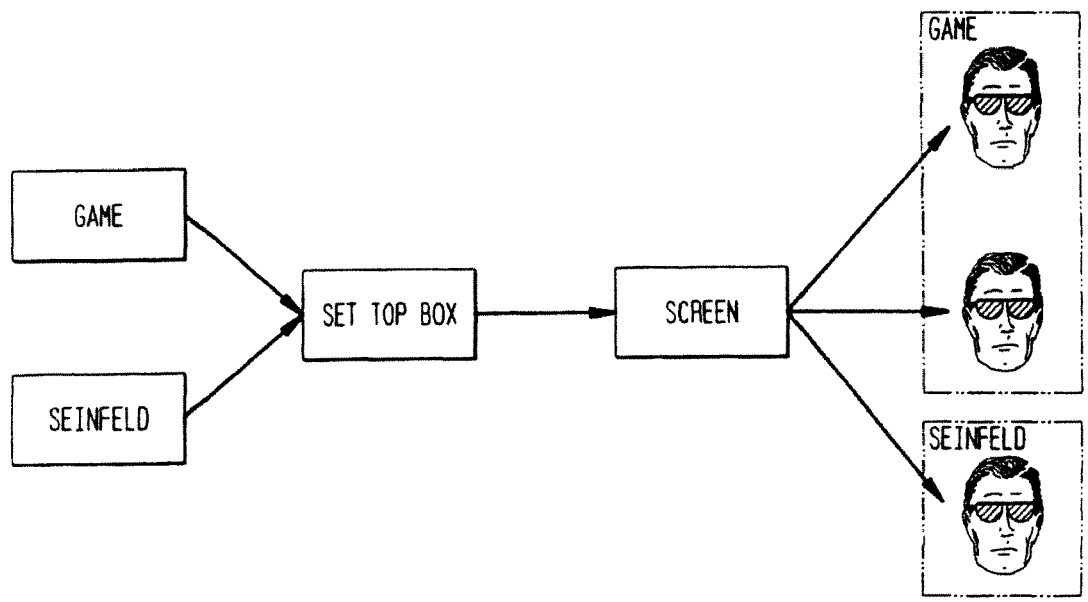
FIG. 15 is a functional diagram of game and television audio/visual content being provided to multiple users in accordance with an aspect of the invention.

In an alternative arrangement, and as shown in FIG. 15, the embodiment shown in FIG. 3C may include a third pair of LCD shutter glasses to permit two individuals to play the video game while, at the same time, a third person watches a television program or video on the same monitor. The two players of the video game may view the video game from the same perspective, in which case the set top box controls the monitor to alternately display the images from the video game and the images from the television program or video. The set top box synchronizes the shuttering of the two pairs of LCD shutter glasses worn by the video game players to the intervals during which the video game is displayed so that the two players view only the video game.

Figure 16:
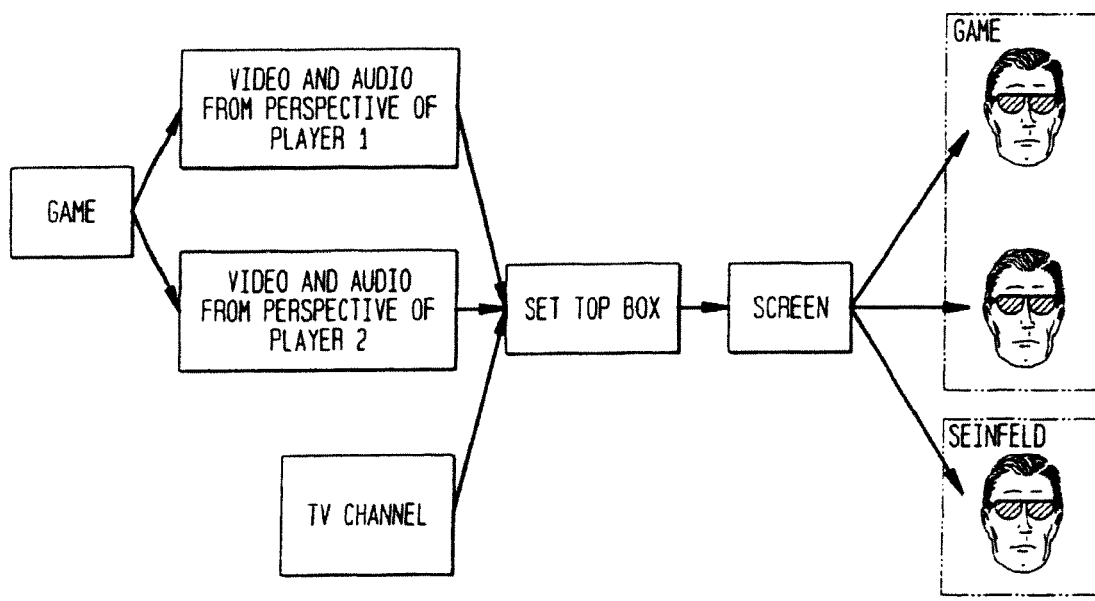
FIG. 16 is a functional diagram of game and television audio/visual content being provided to multiple users in accordance with an aspect of the invention.

As a further alternative as shown in FIG. 16 using the embodiment shown in FIG. 3C, each of the two video game players uses the monitor to view the video game from a different perspective than the other, and the third individual watches and hears the television program or video at the same time also using that monitor. The set top box controls the monitor to cyclically display, e.g., an image from the video game at a first perspective, an image from the video game at a second perspective, and an image from the television program or video. The set top box thus synchronizes the shuttering of the pairs of LCD shutter glasses to the images displayed on the monitor such that a wearer of one of the pairs of LCD shutter glasses plays the video game viewed from the first perspective, a wearer of another of the pairs of LCD shutter glasses plays the video game viewed from the second perspective, and a wearer of the third pair of LCD shutter glasses views the television program or video.

Figure 11:
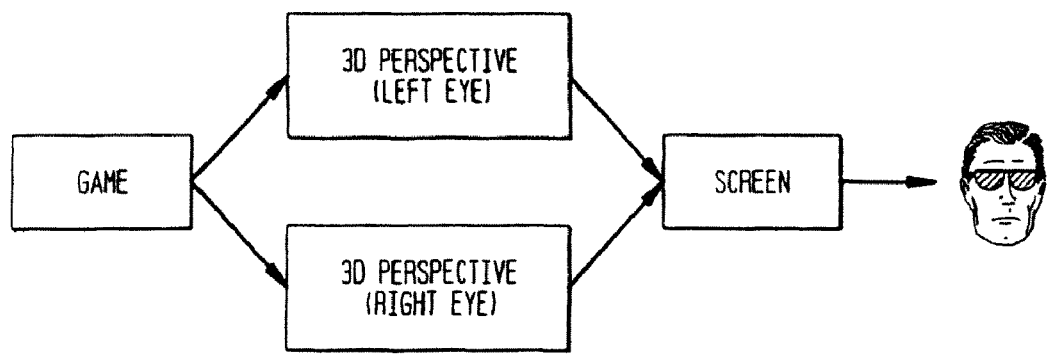
FIG. 11 is a functional diagram of 3-D content being provided to a user in accordance with an aspect of the invention.
Figure 17:
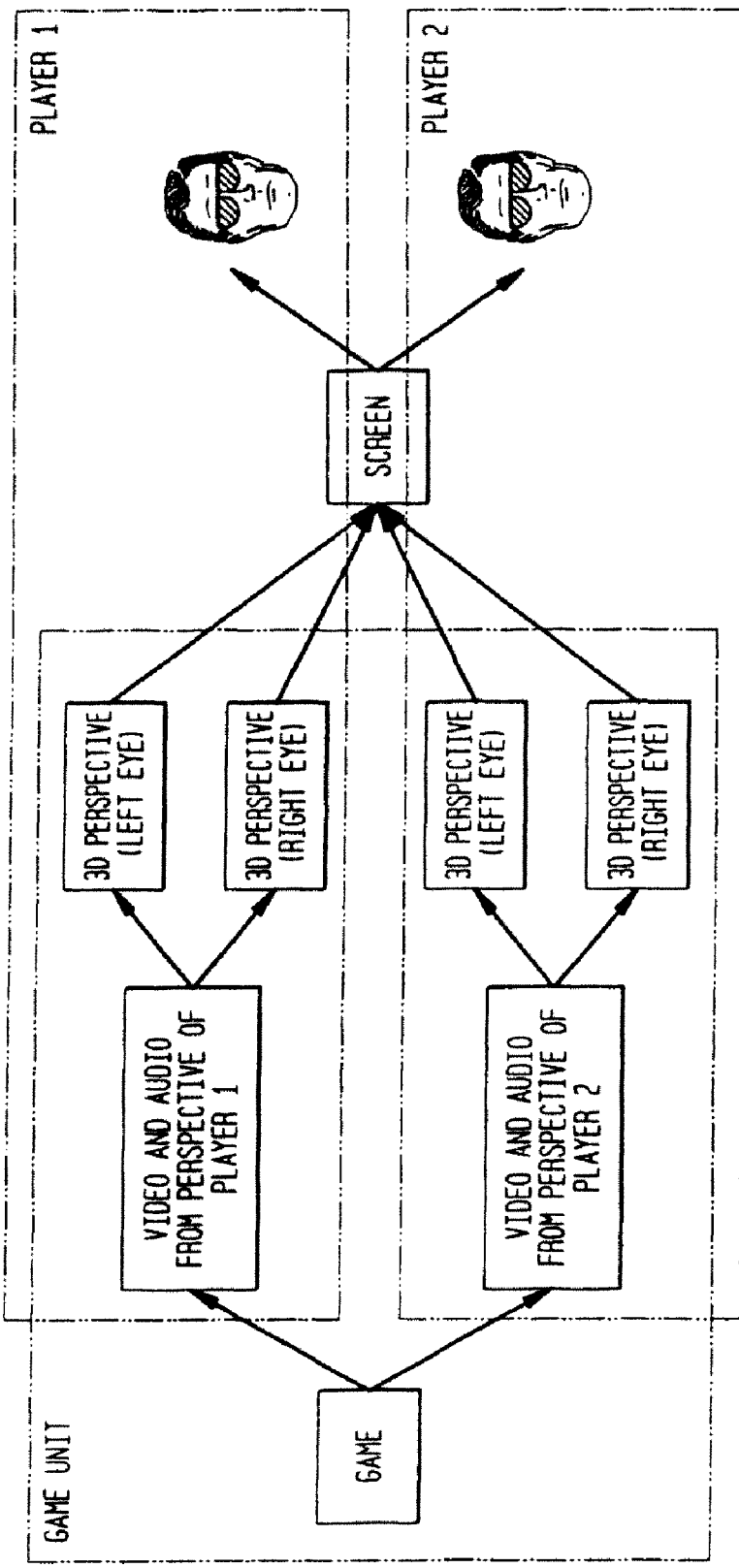
FIG. 17 is a functional diagram of game content, from the same game, being provided to users in 3-D and from perspectives particular to each user, in accordance with an aspect of the invention.

As shown in FIG. 11, the present invention may also provide one or more players of a video game to play the game with in three-dimensions (3D) view and/or permit one or more viewers to view the television program and/or video in 3D. As shown in FIG. 17, each player of a video game may view the game in 3D in addition to ach viewing the game from a different perspective that the other players. Using the arrangement shown in FIG. 3A, for example, the game unit may control the monitor to cyclically show, e.g., a left image frame at a first perspective, a right image frame at the first perspective, a left image frame at a second perspective, and a right image frame at the second perspective. To attain the 3D effect, the left and right shutters of each pair of LCD shutter glasses are synchronized to different displayed images. Thus, the left shutter of one of the pairs of LCD shutter glasses is synchronized to view the left image frame at the first perspective, and the right shutter of that pair of LCD shutter glasses is synchronized to view the right image frame at the first perspective. Similarly, the left shutter of another of the pairs of LCD shutter glasses is synchronized to view the left image frame at the second perspective, and the right shutter of that pair of LCD shutter glasses is synchronized to view the right image frame at the second perspective. As a result, each player of a video game views the game in 3D as well as from his or her particular perspective.

Figure 18:
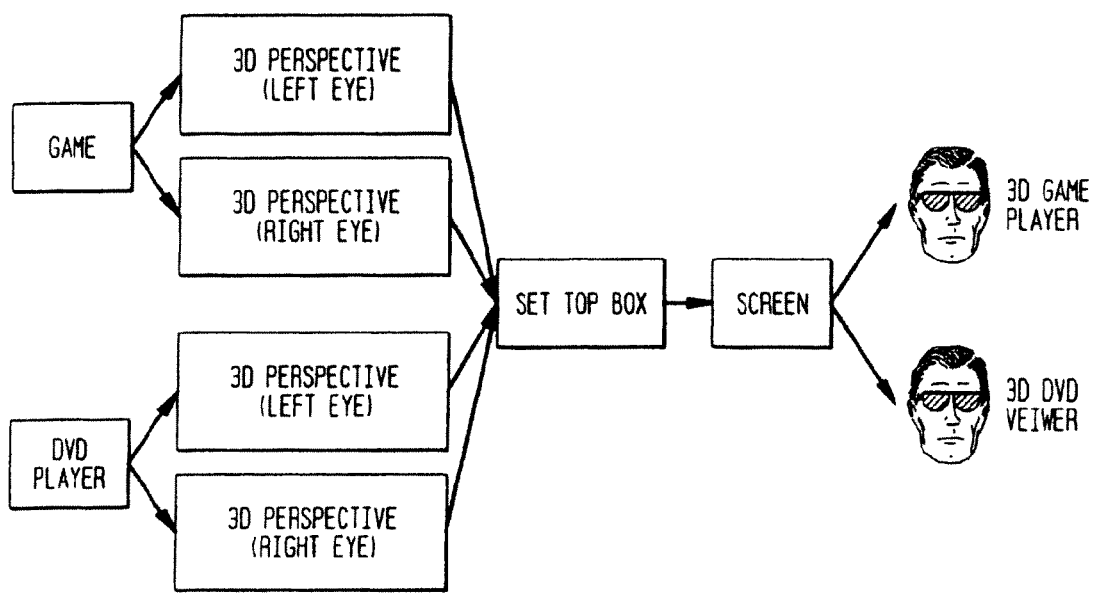
FIG. 18 is a functional diagram of game content being provided to a user in 3-D, and a movie (or other audio/visual content) being provided to a different user in 3-D, in accordance with an aspect of the invention.

As another example, two viewers may watch different television programs and/or videos in 3D at the same time and while viewing the same monitor, such as using the arrangement shown in FIG. 3B, or one may watch a television program or video in 3D while another plays a video game viewed in 3D from the same monitor, such as using the arrangement shown in FIG. 3C. The monitor is controlled to cyclically display, e.g., a left image frame from a television program or video, a right image frame from the television program or video, a left image frame from another television program or video or from a video game feed, and a right image frame from the another television program or video or from the video game feed. The left and right lens of each pair of LCD shutter glasses is thus synchronized such that each wearer views his or her respective television program, video, or video game in 3D. FIG. 18 schematically illustrates one viewer playing a 3D game and another viewer watching a 3D movie on the same screen.

Figure 19:
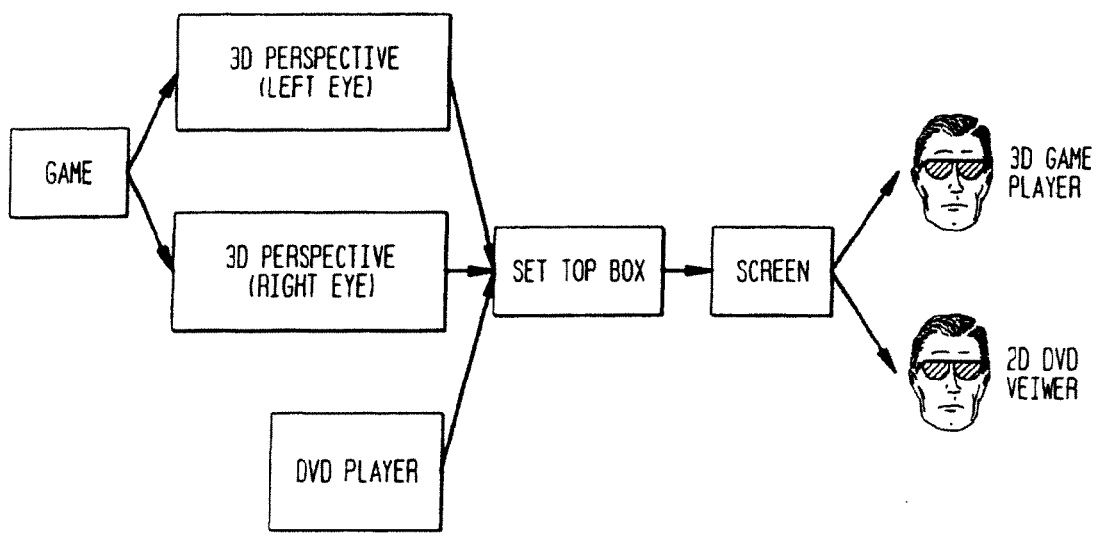
FIG. 19 is a functional diagram of game content being provided to a user in 3-D, and a movie (or other audio/visual content) being provided to a different user in 2-D, in accordance with an aspect of the invention.

In a further example, one or more individuals may play a video game in 3D and another individual may watch two-dimensional (2D) images of a television program and/or video at the same time and while viewing the same monitor, such as using the arrangement shown in FIG. 3C. FIG. 19 also schematically illustrates such an arrangement. The monitor is controlled to cyclically display a left image frame from the video game feed, a right image frame from the video game feed, and a frame from the television program or video. The left lens of one pair of LCD shutter glasses is synchronized to the timing of the left image frame from the video game feed and the right lens of the pair of LCD shutter glasses is synchronized to the timing of the right image frame from the video game feed so that the wearer views the video game in 3D. The left and right lenses of another pair of LCD shutter glasses are both synchronized to the timing of the frame from the television program or video and thus allow the wearer to view the 2D television program or video from the same monitor used to play the video game.

Figure 4:
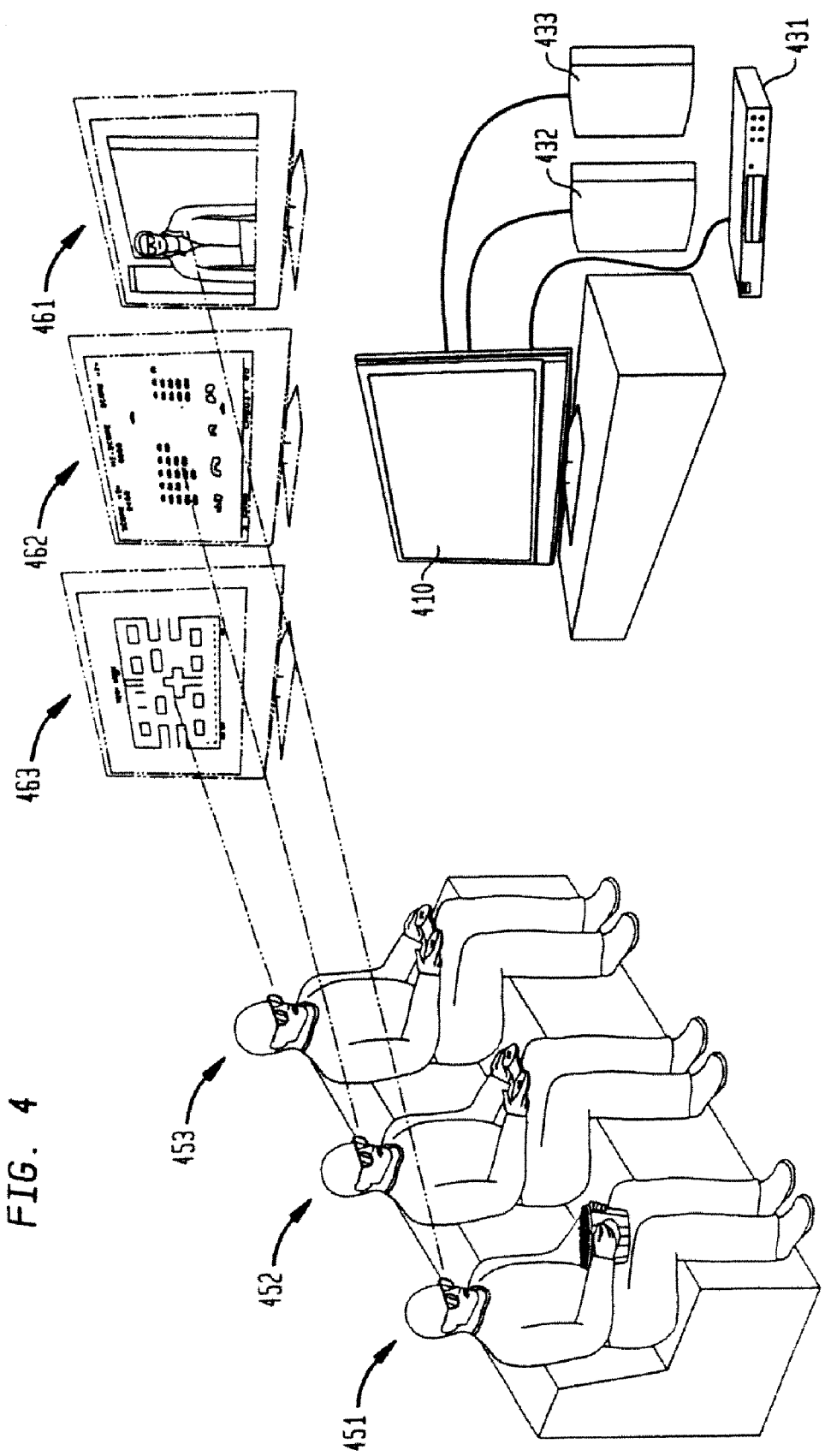
FIG. 4 is representational drawing of people watching different audio/video content on the same screen in accordance with an aspect of the invention.

FIG. 4 illustrates three people watching three different video entertainment programs. In one aspect of the invention, three people 451-452 are each wearing glasses, with headphones, in accordance with the present invention and watching the same television 410. Bravia® television 410 includes a screen sharing apparatus described above, and accepts three different video inputs, namely, two Sony Playstation game consoles 432, 433 and a DVD player 431. The television multiplexes the three different audio/video inputs together as described, and wireless transmits information regarding which visual input is being displayed at any particular time to the glasses. The first person's (451) glasses are shuttered such that he or she can only see through the glasses when the Terminator movie 461 (playing on DVD player 431) is being shown on the screen of television 410. The second person's (452) glasses are shuttered such that he or she can only see through the glasses when the MotorStorm game 462 (playing on Playstation console 432) is being shown on the same television 410. The third person's (453) glasses are shuttered such that he or she can only see through the glasses when the PacMan game 463 (playing on Playstation console 433) is being shown on the same screen. The audio corresponding with DVD player 431, and game consoles 432, 433 is also wireless transmitted to the glasses of persons 451, 452 and 453, respectively. In this manner, each person 451-453 can use a single television to listen and watch three different audio/video sources.

In addition to the above examples, the invention also enables the use of a common monitor to provide other combinations of video games, television programs, and videos together with other combinations of 2D or 3D presentations and/or different perspectives.

II. Tracking, Mixing, Gearing, Parallax Optimizing

FIG. 20A through 20C illustrate examples of communication between glasses 900 and computing console 950. In FIG. 20A, computer console 950 is in wireless communication with glasses 900. Glasses 900 are shown to include a frame that has integrated therein various lights 902. The lights 902 may be infrared (IR), light emitting diodes (LEDs), or other types of lights that are capable of producing illumination from their position on the frames of glasses 900. The frames of glasses 900 also include optional earphones 530 and 532. The glasses 900, as described above, include shutter lenses 901, which are controlled by processing on the glasses, at the computing console, or a combination of processing shared between the computing console 950 and hardware/software on glasses 900.

When processing is performed on the glasses 900, circuitry is included in the frames of glasses 900, as illustrated by circuit 910. Circuit 910 may be integrated at any location within the frame of glasses 900, attached to the frame of glasses 900, integrated into or attached to the shutter lenses 901. Alternatively, circuit 910 can be coupled to the frames of glasses 900 by way of a wired or wireless link. Glasses 900 will also include a power supply (e.g., battery) (not shown) that powers circuit 910, the lights 902, the earphones 530, 532, and other circuitry and/or shuttering electronics. The circuitry 910 can be driven by software, firmware, or a combination of software and firmware, and can be executed on the glasses, or on the computing console 950. In one embodiment, more processing is performed at the computing console when processing is intensive, whereas processing is performed on circuit 910 (and/or other circuitry of glasses 900) when processing is more efficient to do so.

FIG. 20B illustrates another example of glasses 900 placed in communication with computing console 950. In this embodiment, glasses 900 will also include a camera 912 integrated within the frame. The camera 912 is shown integrated at a center location of the frame of glasses 900 between the shutter lenses 901. Other locations for camera 912 may also be possible so long as the camera is capable of viewing forward from the glasses 900 when glasses 900 are being worn by a user.

Camera 912 is used to provide additional information to the circuit 910 for processing of the user's location in space relative to the monitor, screen, or display. As the user moves around in front of the display, the camera 912 can take images of the surroundings and objects in front of the user to identify the user's specific location relative to the screen. In one embodiment, the camera can focus in on specific objects, such as the screen, to identify the user's particular location during processing, interaction with a video game, interaction with a video presentation, or other interfacing.

In other embodiments, the camera 912 is capable of identifying the outline of a video screen (e.g., television, computer monitor, hand-held display, etc.) by identifying the intensity of light emanating from the outline of the video screen. By identifying the outline of the video screen, the processing performed on the glasses by circuit 910 and the computing console 950, the positional correlation of the user (e.g., head of the user- and viewing direction) relative to the screen may be tracked. The tracking can be dynamic such that, as the user moves around, the video presented on a screen can be adjusted to provide the correct viewing angle. More detail of this adjustment will be described below, with reference to parallax, and the correct viewing of 3D images, from the perspective of offset human eyes and the natural frustum defined between the eyes and a screen being viewed.

FIG. 20C illustrates another embodiment where glasses 900 interface with computing console 950. In this embodiment, computing console 950 will also include a camera 952. Camera 952 may also include an optional filter 951. Optional filter 951 can be used to filter out all light except for the IR light emanating from lights 902, in embodiments where lights 902 are in the form of IR emitters. In other embodiments, the optional filter 951 may be used for embodiments where LEDs are present on the glasses 900, and the filter is designed to filter ambient light, disturbance in light, polarize light and/or remove abnormalities that may interfere with accurate detection of the positional locations of lights 902.

By way of example, the optional filter 951 can be used to enable accurate searching and detection of the lights in the captured video frames, by detecting the white Gaussian features in a black or semi-black background. The captured video frames can, in one embodiment, include a plurality of non-compressed frames or compressed frames. Many compression techniques can be used, including MPEG compression that makes use of I, P, B, frames. As is know, I frames are complete frames that include all of the image data and associated pixel data. P and B frames either borrow from data in previous frames or later frames, to reconstruct the image, in cases where data does not substantially change. In these various embodiments, the processing of image data and associated pixels can facilitate identification of the lights 902 and tracking of the glasses 900. In still another embodiment, optional filter 951 is not included as part of camera 952, and camera 952 can simply detect the light emanating from lights 902 for accurate detection during use.

Continuing with the embodiment of FIG. 20C, the glasses 900 will have their own viewing range 920, as provided by camera 912. Whereas camera 952 will have its own viewing range and is shown detecting light emanating from lights 902. Lights 902 can thus be tracked by the computing console 950.

By tracking the positional orientation of the glasses 902, when worn by a user, it is possible to dynamically adjust the images displayed on a monitor/display (now shown) in order to provide a more clear presentation of images being viewed through glasses 900. In one embodiment, the video displayed on a screen is a 3D presentation. For this embodiment, each lens 901 will alternate closing its shutter (e.g., left/right). While the alternating between left and right is being processed, a determination is also made regarding the tracked position of the glasses 900. If the user is directly in front of the screen, then the image data for a proper parallax vision can be maintained substantially normal. However, if the user is detected or tracked to be close to the screen, e.g., at some offset angle closer to the screen or far from the screen, the presentation of the video stream will be adjusted to compensate for the offset angle. By adjusting the video stream, based on the detected offset angle, it is possible to present the user with a proper parallax view, as would be expected if the user was positioned direction front center of the screen. Normally, not adjustment is made to the presented image, as all optimization is made for the center positioned user. However, this is not the case when a user is actively moving in front a screen or a user is not sitting directly in front of the screen. For example, in a large IMAX presentation, users can be sitting off to one side of the theater, down below, or too far up. Because the optimization is set for the center "sweet spot" views sitting in non-optimal seats will not be granted the best view.

In the context of a smaller home environment, few users may be engaged at one time, and it is possible to adjust the view for each user independently, by alternating the frequency, and dividing the total frequency for each user. For an example of two users, with a 120 fps screen, two users will be granted alternating 60 fps—which is a very good refresh rate. Still further, for a 3D viewer, the user's left/right eye will share views every other image, as synchronized with the shutter rates of the glasses 900. Still continuing with the example, if user 1 chooses to sit up front and to the left, and user 2 chooses to sit far back and to the right, each user's viewing angle frustum will be dynamically adjusted, so that the screen outputs image data optimized for their location. This optimization is, however, dynamic, and can change as users decide to move around during the viewing process.

The optimization of the screen output for each user, thus optimizes the parallax vision expected by a user. Parallax is an apparent displacement or difference of orientation of an object viewed along two different lines of sight, and is measured by the angle or semi-angle (e.g., view frustum) of inclination between those two lines. The term is derived from the Greek word (parallaxis), meaning "alteration". Nearby objects have a larger parallax than more distant objects when observed from different positions, so parallax can be used to determine distances.

By adjusting the image displayed, in response to the user's movement in position, it is possible to maintain the best optimized parallax, which would normally only be possible in the middle of a room. In interactive games, where users move around, distortion would result. Thus, the dynamic and automated adjustments made to the display screen, based on the detected position of the user, provides freedom of movement not possible with current 3D viewing systems.

Given the tracked position of the glasses 900, the system 952 or circuit 910 (or combination) can frequently check 3D stereoscopic effects and perform parallax error correction during 3D content development.

Figure 20D:
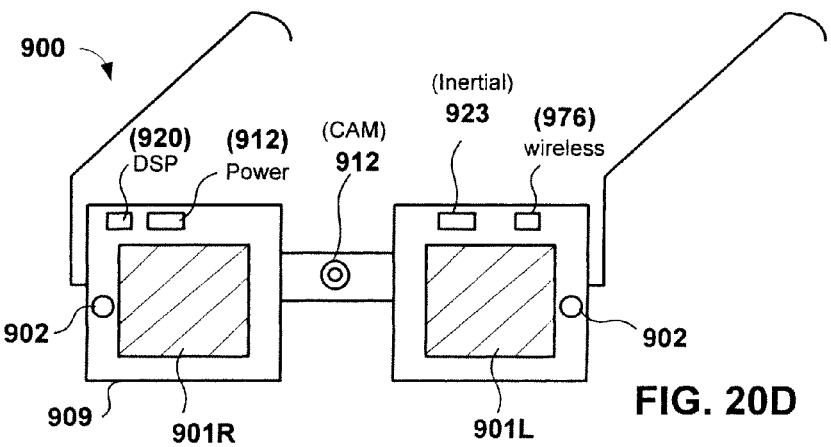

FIG. 20D illustrates a block diagram of glasses 900, in accordance with one embodiment of the present invention. Glasses 900 are shown having a frame 909 with the integrated hardware and software for processing tracking of the user, in accordance with one embodiment of the present invention. As shown, frame 909 of glasses 900 include the lights 902, which are positioned at opposite ends of the glasses 900. The lights 902 are preferably separated by a distance that can be monitored by camera 952 of the computing console 950, to determine the orientation of glasses 900, as well as the user's position relative to camera 952. In this example, a plurality of modules are integrated within the frame 901, which make up the circuit 910 discussed with reference to FIG. 20B, and will be discussed with reference to FIG. 20E.

Circuit 910 is broadly referred to as a circuit, although the circuitry can include software, power, and communication logic. In the example of FIG. 20D, the circuit 910 will include a digital signal processor (DSP) 920, a power module 921, an inertial sensor 923, and a wireless transceiver 976. Inertial sensor 923 is provided to detect movement of the user while he/she is wearing glasses 900, and such movement of the user's head/body will provide inertial feedback that is processed by digital signal processor 920, and may be communicated back to the computing console 952 via wireless module 976. Camera 912 is also integrated as part of glasses 900 of FIG. 20D, and camera 912 is configured to provide additional data back to the digital signal processor 920, for processing and for controlling the shuttering during 3D operation (e.g., shuttering lens 901R and lens 901L). As described above, the shuttering control also defines the possible sharing of the same screen, to enable viewing by different users at the same time. When viewing at the same time by different users, the users can be viewing the same content, yet the shuttering shares the screen to provide a different adjusted offset control, to maintain accurate parallax vision.

Figure 20E:
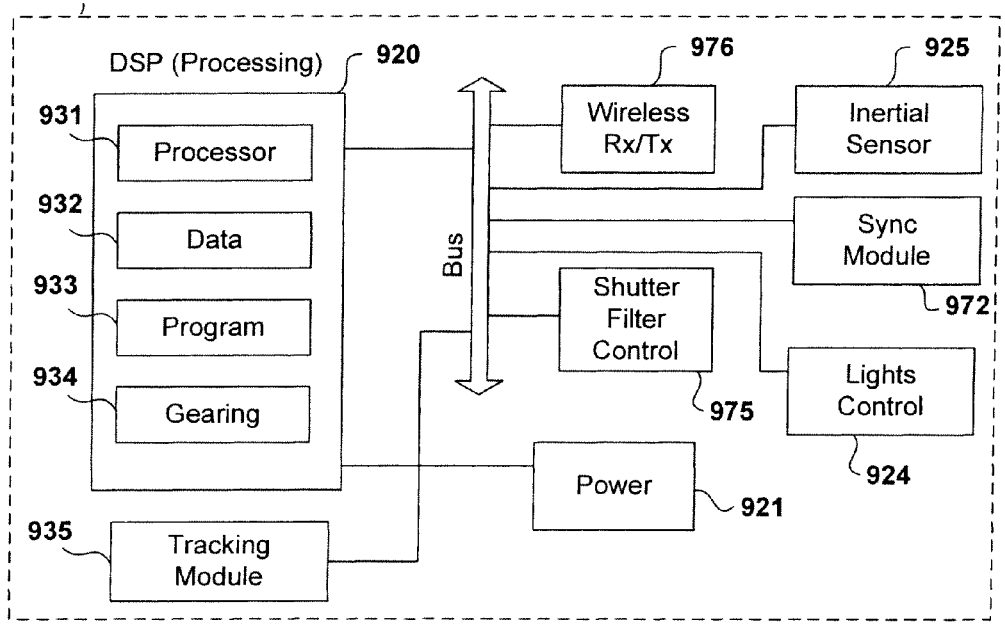

FIG. 20E illustrates a more detailed example diagram of an exemplary module or diagram of circuit 910. Of course, fewer or more modules can make up circuit 910, depending on the optimization. Circuit 910 can include the digital signal processor 920. Digital signal processor 920 can include a processor 931 for executing program instructions and interfacing with the various modules to control interaction between the shuttering operations (3D, and parallax correction), as well as provide feedback through the wireless module 976 to the computing console 950. DSP 920 also includes data 932. Data 932 can be stored in a memory chip, such as flash memory, or storage memory that stores program instructions, operating instructions, operating system kernel instructions, startup initializations and updates. Data may also hold information for executing input/output transactions and cache interfacing for processor 931.

DSP 920 can also include a program 933. Program 933 can be updated based on revisions to the program, improvements to a program, and changes to a program. The program, in one embodiment, controls the processing by the processor 931, and can control, direct, or trigger operation of the right shutter lens and left shutter lens 901R and 901L. In one embodiment, this shutter and parallax adjustments can be based on the positional data obtained by a tracking module 935. A gearing module 934 is also included as part of DSP, or can be integrated into a program 933, or stored as part of data 932. The gearing information is provided to change dynamically the processing by the program 933, or execution by the processor in a dynamic and changing manner based on the interactivity of the user with a specific program. The gearing can also be integrated with the program 933 to provide mode changes during operation such that the gearing changes dynamically based on interactivity, or user feedback.

As mentioned above, tracking module 935 processes information related to data obtained from the computing console 950, based on detected light position control 924, inertial sensors 923, and positional tracking of glasses 900 using lights 902, or tracking information obtained by glasses 900 of the environment using camera 912. This information is dynamically provided to tracking module to convey information to the DSP 920. The DSP 920 can then communicate with shutter filter control 975 to control the shuttering the glasses based on the environment, control parameters, gearing effects, and other program parameters. Light control 924 can include hardware or software that is designed to control the lights 902 on the glasses. Light position control 924 can act to strobe the lights 902, modulate lights 902, keep lights on or off for periods of time, or turn off lights 902 for non-tracking interaction. Sync module 972, as mentioned above, is designed to synchronize the shuttering rate of the right and left shutter lenses 901 to synchronize with the display rate and display information provided on a screen, to sync for multiple users viewing different channels, or to sync for multiple users viewing the same channel with parallax adjustment.

As used herein, gearing provides inputs, changes inputs, or affects inputs, when interacting with a computer program. Gearing, in the general and broadest sense, can be defined an input that can have varying degrees in magnitude and/or time. The degree of gearing can then be communicated to a computing system. The degree of gearing may be applied to a process executed by the computing system. By analogy, a process can be imaged as a bucket of fluid having an input and an output. The bucket of fluid is a process that is executing on a system, and the gearing therefore controls an aspect of the processing performed by the computing system. In one example, the gearing can control the rate at which the fluid is emptied from the fluid bucket relative to an input amount, which might be thought of as drops of fluid going into the bucket. Thus, the fill rate may be dynamic, the drain rate may be dynamic, and the drain rate might be impacted by the gearing. The gearing can thus be adjusted or timed so as to tune a changing value that may be streaming to a program, such as a game program. The gearing may also impact a counter, such as a moving data counter that then controls an action by a processor or eventually a game element, object, player, character, etc.

Taking this analogy to a more tangible computing example, the rate at which the fluid is emptied might be the rate at which control is passed to or executed by a feature of a computer program, in response to some input plus gearing. The feature of the computer program may be an object, a process, a variable, a shutter's timing, or predefined/custom algorithm, character, game player, mouse (2D or 3D), etc. The result of the processing, which may have been altered by the gearing, can be conveyed to an observer or impact the display adjustments for delivering correct parallax correction to specific users, based on their position and any tracked movement.

The input can be obtained by tracking performed via: (1) a image analysis, (2) an inertial analysis, (3) acoustic analysis, or hybrid Mixed analysis of (1), (2) or (3). Various examples are provided regarding image analysis and applied gearing, but it should be understood that the tracking is not limited to video, but can accomplished by numerous ways, and in particular, by inertial analysis, acoustic analysis, mixtures of these and other suitable analyzers.

In various embodiments, a computer or gaming system having a video camera 952/912 (e.g., image analysis) can process image data and identify various actions taking place in a zone of focus or given volume that may be in front of the video camera. Such actions typically include moving or rotating the object in three dimensional space or actuating any of a variety of controls such as wearing glasses 901, pushing buttons, dials, joysticks, etc. In addition to these techniques, the present technology further provides the additional functionality of adjusting a scaling factor, referred to herein as gearing, to adjust the sensitivity of the input with respect to one or more corresponding actions on a display screen or a feature of a program. For instance, the actions on the display screen may be of an object that may be the focus of a video game. The object may also be a feature of a program, such as a variable, a multiplier, or a computation that will then be rendered as sound, vibration, images on a display screen or a combination of the these and other representations of the geared output.

In another embodiment, gearing can be applied to a feature of a computer program, and detection of an input device can be based on processing by an inertial analyzer. The inertial analyzer will track an input device for inertial activity, and the inertial analyzer can then convey the information to a program on glasses 900, computing console 950, or cloud computing over the internet. The program will then take the output from the inertial analyzer so that a gearing amount can be applied to the output or activity of the shutter lenses 901L/901R. The gearing amount will then dictate a degree or ratio by which a program will compute an operation. The operation can take on any number of forms, and one example of the operation can be to generate a noise, a variable nose, vibration, a movement by an object, or computation by a program that then outputs a visible and/or audible result. If the output is a variable, the variable may be used to complete the execution of a process, such that the process will take into account the amount of gearing. The amount of gearing can be preset, set dynamically by the user or adjusted on demand.

Various types of inertial sensor devices may be used to provide information on 6-degrees of freedom (e.g., X, Y and Z translation (e.g., acceleration) and rotation about X, Y and Z axes). Examples of suitable inertial sensors for providing information on 6-degrees of freedom include accelerometers, one or more single axis accelerometers, mechanical gyroscopes, ring laser gyroscopes or combinations of two or more of these.

Signals from the sensor(s) may be analyzed to determine the motion and/or orientation of the glasses 900 during play of a video game or viewing of a screen (any content-movie, clip, game, PDA, phone, computer screen). Such a method may be implemented as a series of processor executable program code instructions stored in a processor readable medium and executed on a digital processor. For example, a video game system may include one or more processors. Each processor may be any suitable digital processor unit, e.g., a microprocessor of a type commonly used in video game consoles or custom designed multi-processor cores. In one embodiment, the processor may implement an inertial analyzer through execution of processor readable instructions. A portion of the instructions may be stored in a memory. Alternatively, the inertial analyzer may be implemented in hardware, e.g., as an application specific integrated circuit (ASIC) or digital signal processor (DSP). Such analyzer hardware may be located on the glasses 900, console 950 or on a server during cloud computing. In hardware implementations, the analyzer may be programmable in response to external signals e.g., from the processor or some other remotely located source, e.g., connected by USB cable, Ethernet, over a network, the Internet, short range wireless connection, broadband wireless, Bluetooth, or a local network.

The inertial analyzer may include or implement instructions that analyze the signals generated by the inertial sensors and utilize information regarding position and/or orientation of a glasses 900. The inertial sensor signals may be analyzed to determine information regarding the position and/or orientation of the glasses 900. The position and or orientation information may be utilized during play of a video game with the system.

In one embodiment, glasses 900 may include one or more inertial sensors, which may provide position and/or orientation information to a processor via an inertial signal. Orientation information may include angular information such as a tilt, roll or yaw of the controller. As noted above, and by way of example, the inertial sensors may include any number and/or combination of accelerometers, gyroscopes or tilt sensors. In a one embodiment, the inertial sensors include tilt sensors adapted to sense orientation of the glasses 900 with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller. Such techniques may be implemented by instructions from the game program or general program, which may be stored in memory and executed by a processor.

By way of example an accelerometer suitable as an inertial sensor may be a simple mass elastically coupled at three or four points to a frame, e.g., by springs. Pitch and roll axes lie in a plane that intersects the frame, which is mounted to the glasses 900. As the frame rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, light sources may provide telemetry signals to the processor, e.g., in pulse code, amplitude modulation or frequency modulation format. Such telemetry signals may indicate positional location of the glasses 900. Telemetry signals may be encoded into the optical signal, e.g., by pulse coding, pulse width modulation, frequency modulation or light intensity (amplitude) modulation. The processor may decode the telemetry signal from the optical signal and execute a command in response to the decoded telemetry signal.

A processor may use inertial signals from the inertial sensor in conjunction with optical signals from light sources detected by an image capture unit and/or sound source location and characterization information from acoustic signals detected by a microphone array to deduce information on the location and/or orientation of glasses 900 and/or its user.

Figure 20F:
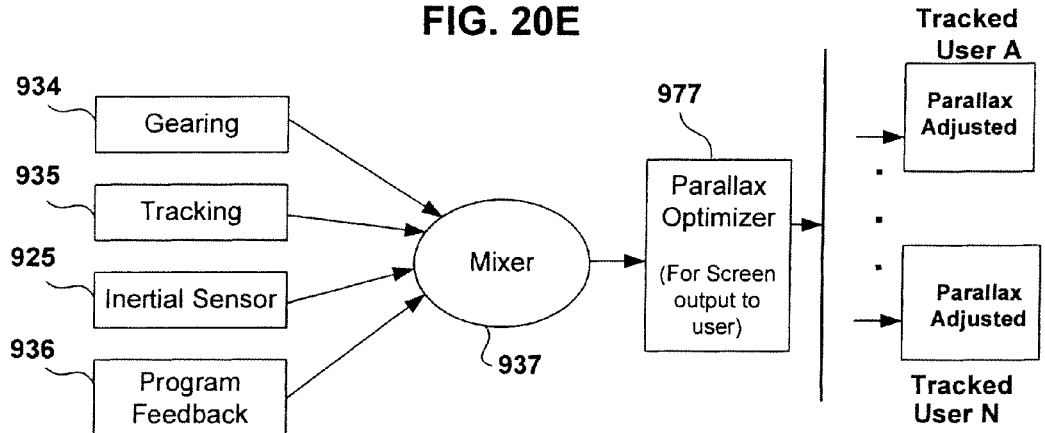

FIG. 20F illustrates an embodiment where input information for different sensing mechanisms is provided to a mixer 937. Mixer 937 can be executed in software or hardware, or processed by DSP 920. Mixer 937 is, in one embodiment, logic that takes inputs and constructs selective inputs to produce an output. The inputs can be weighted, based on current processing. The selection and emphasis given to each input will depend on the processing during the interactive application. For instance, if the user is viewing a scene of the Grand Canyon, Ariz., the mixer might provide more emphasis on the tracking input than the inertial sensing. With tracking being emphasized, the user's perspective view through glasses 900 will be given priority, to enable the user to view 3D depth aspects down the canyons, as if the user were flying over the Grand Canyon. In other embodiments, the mixer 937 will still blend the inputs to produce a blended result, optimized for the display content being viewed using glasses 900, and the resulting display adjustments for proper parallax compensation.

In one embodiment, mixer 937 can be partially processed on the computing console 950, and data communicated back to glasses 900 so as to control a parallax optimizer 977. Parallax optimizer performs the optimization of the viewing angel by adjusting the content on the display (e.g., 960), for the user's position. Thus, the parallax optimizer 977 will communicate data to the hardware and/or software of the display, to modify the presented content for the user based on the shutter channel that is dedicated to the user. In other embodiments, the computing console will optimize the display data, and the screen 960 will simply present the output.

The mixer 937 is shown obtaining input from the gearing module 934, the tracking module 935, the inertial sensor 935, and program feedback 936. Program feedback can include data regarding the present state of the program during interaction. For instance, if the user is interacting with the program and has obtained a particular level of success in the video game, the program feedback can indicate that the skill level has been increased, and the complexity of the video game has in turn, been raised. The program feedback therefore provides that information to mixer 937, which also brings the information regarding the inertial sensor for movement of the user's head during the interactivity as well as tracking and gearing.

The tracking controls an input to the mixer by informing mixer 937 where the user is relative to the screen, its positional location, and its viewing angle to the screen. Accordingly, the tracking information coming from tracking module 935 will allow mixer 937 to appropriately feed data to the parallax optimizer, so that the viewing is optimal for the user, based on the current position relative to the screen during interactivity with a video game, or while watching a specific video presentation.

A video presentation can be provided through a game console, an internet connection, a digital video box, a player, a broadcast television connection, or any other video clip or motion presentation on a display screen, including a still image (compressed or not). Although mixer 937 is shown receiving multiple inputs, some implementations will only take input from some modules at one time. For instance, the mixer 937 may only take input from gearing during a specific period of time, state, stage, or tracking during a specific period of time, or inertial sensors during a specific period of time, or program feedback for a specific period of time or event. In other embodiments, selective inputs can be combined/blended or inputs from the modules can be completely eliminated (or added) based on the environment and interactivity desired by the user or preset by a program.

FIGS. 21A through 21C illustrate examples of the user 903a moving freely using glasses 900 in accordance with one embodiment of the present invention. In FIG. 21A, the user 903a, wearing glasses 900, is shown freely moving and turning 940A as shown in FIG. 21B. In FIG. 21C, the user has bent down and is moved closer 940B to a screen (not shown). In this embodiment, user 903a is using glasses 900 that include lights 902, as well as a camera 912. In one embodiment, camera 912 is optional. In this example, the lights 902 (which can be LEDs, IR, or other light sources (colored or not)), are integrated or coupled to the frame of glasses 900, so that side views of glasses 900 will still show lights 902. In one embodiment, lights 902 will be in the form of a fish-eye, which will allow a camera to see lights 902 when the user is directly facing the screen, or the user is turned and only one of the lights 902 are shown, as illustrated in FIG. 21B.

Figure 22A:
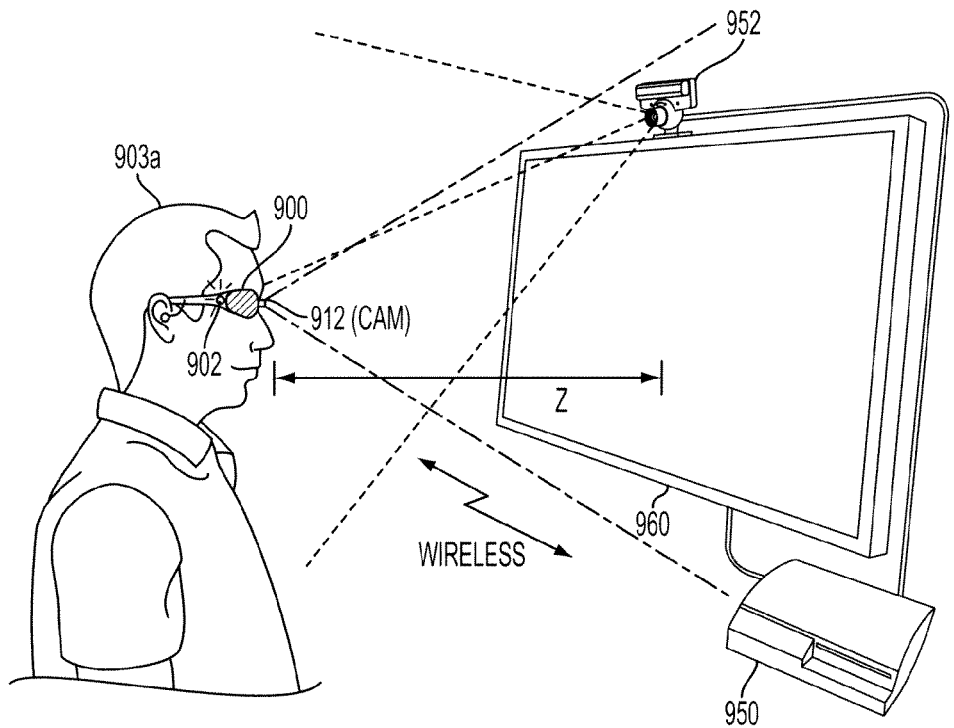
FIGS. 22A-22B illustrate examples of tracking shutter glasses, and cameras integrated in glasses to provide additional positional and orientation.
Figure 22B:
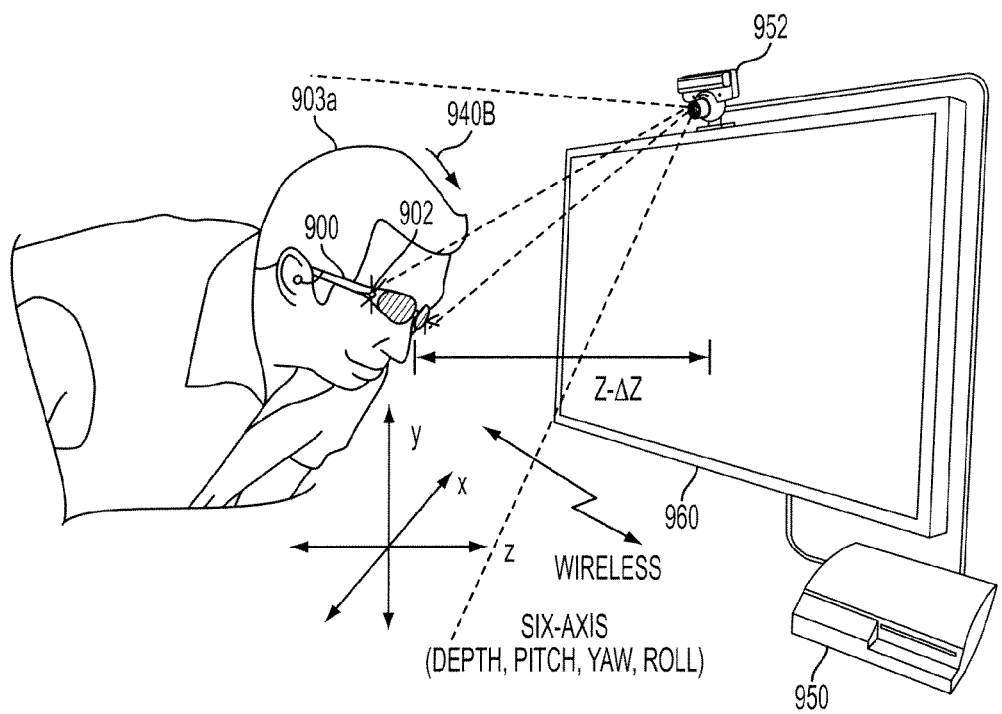

FIGS. 22A and 22B illustrate examples of user 903a wearing glasses 900 and viewing a screen 960. Screen 960 in this embodiment, is coupled to computing console 950. Computing console 950 is also connected to a camera 952, which is placed over screen 960. Camera 952 can be placed at any location, or integrated into the screen. Essentially, camera 952 is preferably designed to view the zone in front of screen 960, which will include users, such as user 903a. In this example, glasses 900 will also include camera 912. Camera 912 is shown capturing the scene that includes screen 960 and camera 952. The information captured by camera 912 can be communicated back to the computing console 950, and which allows programs run on computing console 950 to execute changes and respond to input from the user. The input by the user can simply be a change of the user's position.

The computing console 950 can also control the video presentation provided on screen 960. Screen 960 will thus illustrate information (pixel data-video or still images) that can be synchronized with the shuttering of glasses 900. As discussed above, user 903a can be a single user that is provided a particular view of screen 960, while other users (not shown in this diagram) can be provided different video streams while looking at the same identical screen 960. The shuttering of glasses 900 will thus allow the screen 960 to present data that is intended for user 903a. The information gained by camera 912, as discussed above, will allow circuitry 910 of glasses 900 to process information regarding the user's position relative to screen 960.

In this example, user 903a is shown separated from screen 960 by a distance z. Distance z will thus change dynamically as the user watches the content presented in screen 960. Watching the content can include passive watching such as viewing a video, or active participation when interfacing with an interactive program. The interactive program can be a video game, the internet, technical programs, computer aided design programs, art rendition programs, architectural modeling programs, and other types of interactive program interfacing.

The glasses 900 are also shown to be interfaced with the computing console 950 via a wireless connection. The wireless connection, as described above, can be a Wi-Fi connection, a Bluetooth connection, a radio connection, or the like. Alternatively, the glasses can be connected to the computing console 950 via a wire. In still another embodiment, the computing console 950 may be eliminated and the screen 960 can be connected to the internet. Screen 960 can include a network interface module that allows interfacing with the internet to allow plowed computing for rendering the images on screen 960 and interfacing with data communicated to and from glasses 900.

Figure 24:
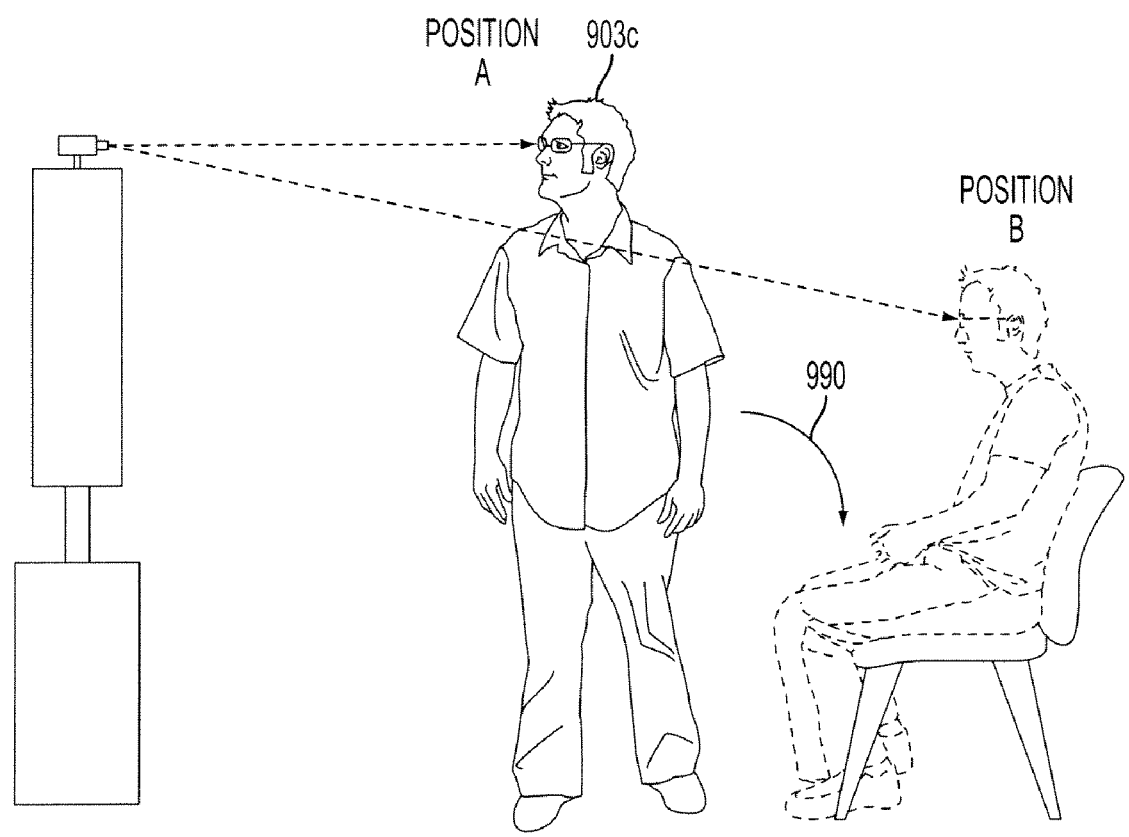
FIGS. 24 and 25 illustrate users moving about rooms, while their position is detected to provide for adjustments in screen presentations, in the adjustment of parallax views.
Figure 25:
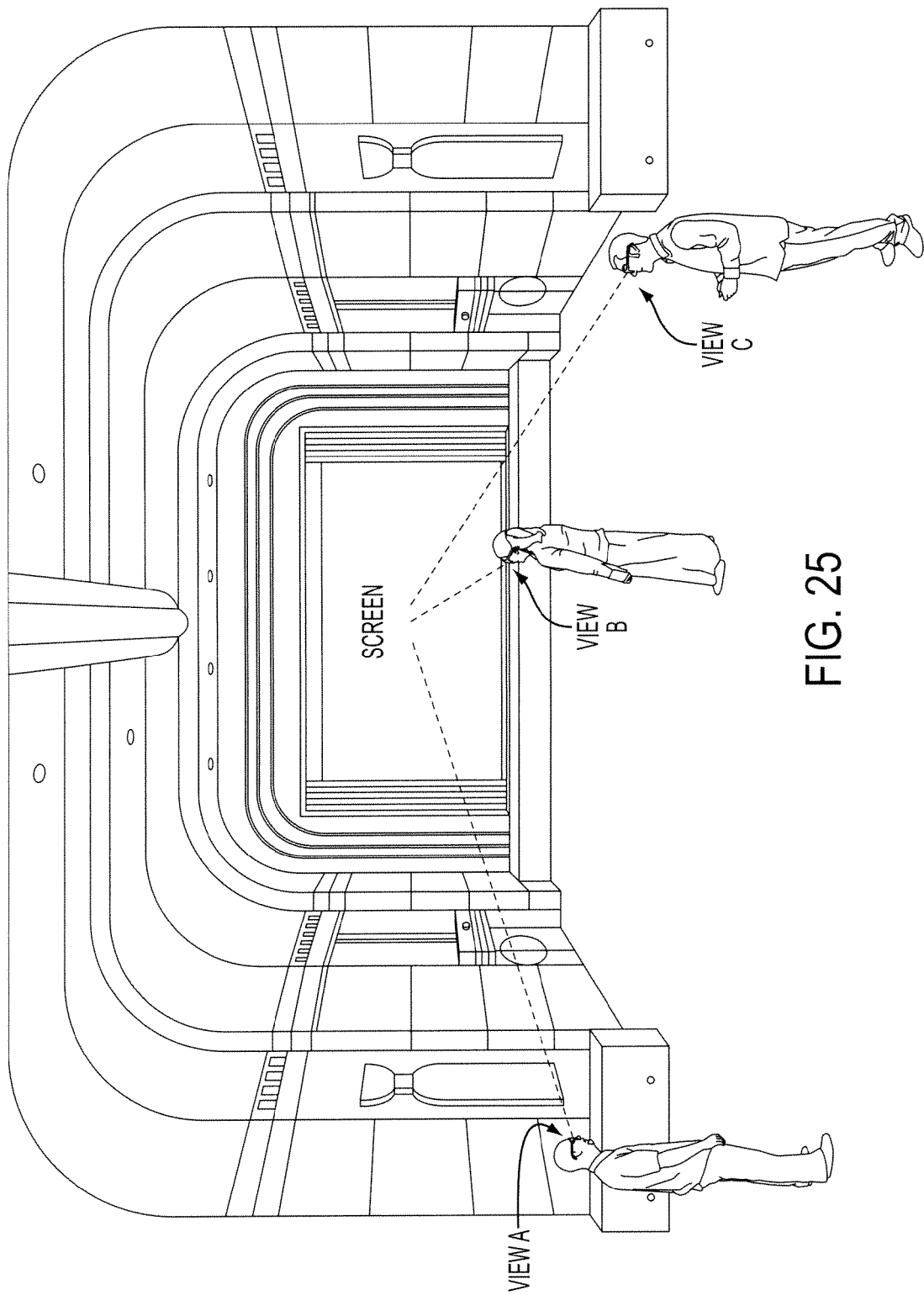

FIG. 22B illustrates user 903a in a bent down position after movement 940B. After movement 940B, information regarding the inertial data generated from the movement can be captured by the inertial sensor integrated within the glasses 900. Additionally, the camera 952 can track the lights 902 to determine the depth and position of the user relative to screen 960. In the example, the user is now at a distance in depth of z minus delta z. In addition to monitoring depth, the lights 902 can also monitor information regarding pitch, yaw and roll in the x y and z coordinates illustrated in FIG. 22B. By monitoring both the depth, and the pitch, yaw and roll, it is possible to convey that information to the processing in glasses 900 to modify and optimize display on screen 960, as viewed through glasses 900, thus providing optimized parallax viewing of screen 960. Again, in one embodiment, parallax optimization will be of the image being presented on the screen 960, based on the user's position. FIGS. 24 and 25 illustrate examples where users move around in front a screen (small and large), and the position being detected provides feedback to the system that controls the screen to optimize the display angel, such that the best parallax is presented to the user, no matter where is moving to and from. In FIG. 24, the user 903c moved from position A to position B, as is common during viewing sessions. In FIG. 25 three users have different views A, B and C, of a large screen. Although the screen is large, the viewing angle will affect the parallax. However, by use of the tracking glasses and the selective shuttering for each user, each user can be provided with an optimized view of the screen. In the example of FIG. 25, the frame rate would be divided by three, to provide each user their own adjusted view, with respect to their viewing angle.

Figure 23A:
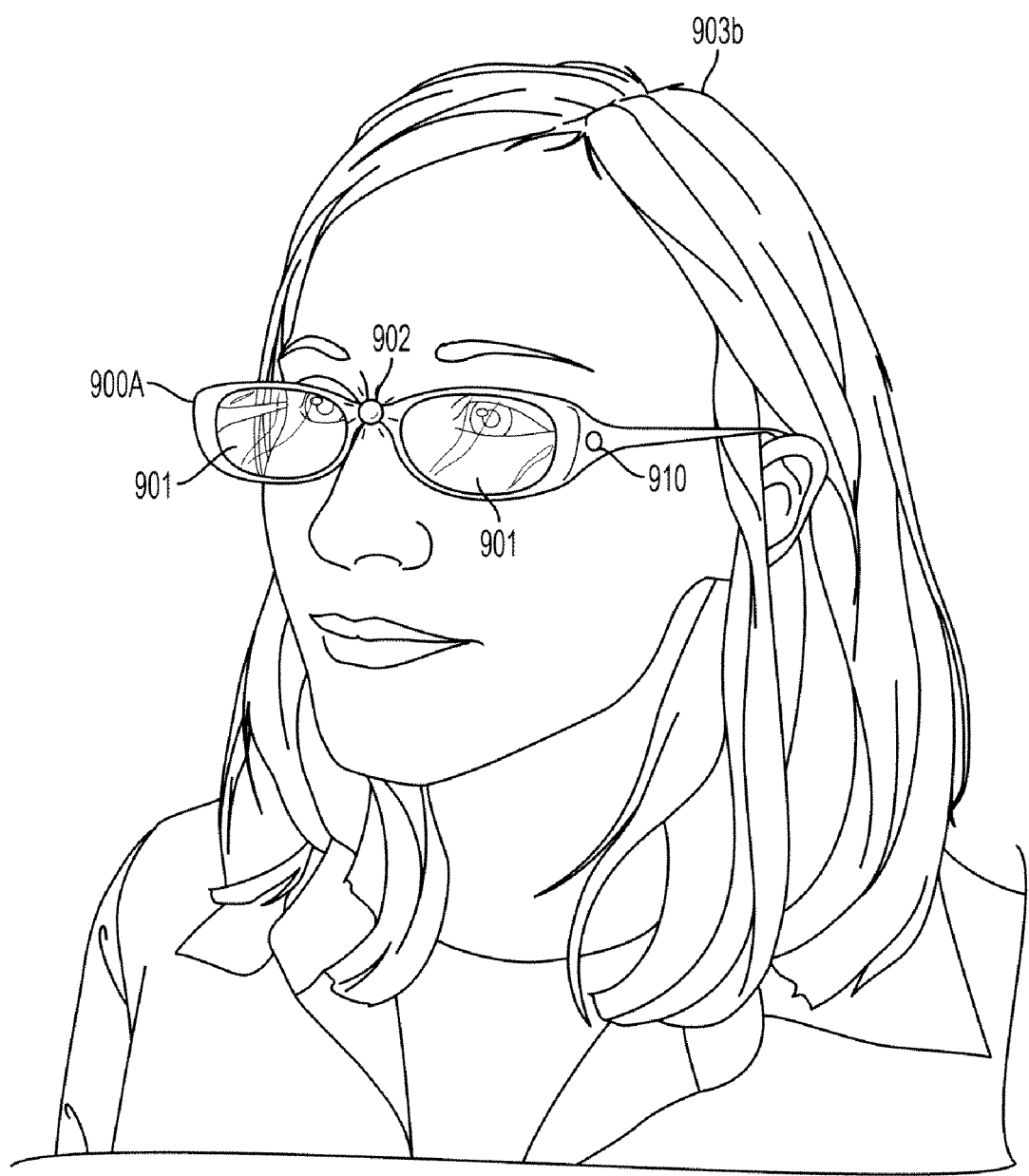
FIGS. 23A-23E illustrate embodiments where glasses include lights and cameras, in accordance with examples of the present invention.

FIG. 23A illustrates an example of a user 903b wearing glasses 900A. In this example, glasses 900A will include a single light 902 placed at a fashionable location between the lenses 901. Circuit 910 can thus operate with light 902 to provide the appropriate on/off sequences, patterns, and strobing to allow accurate tracking of the user while the user interfaces with an interactive program or passive program being displayed on a screen.

Figure 23B:
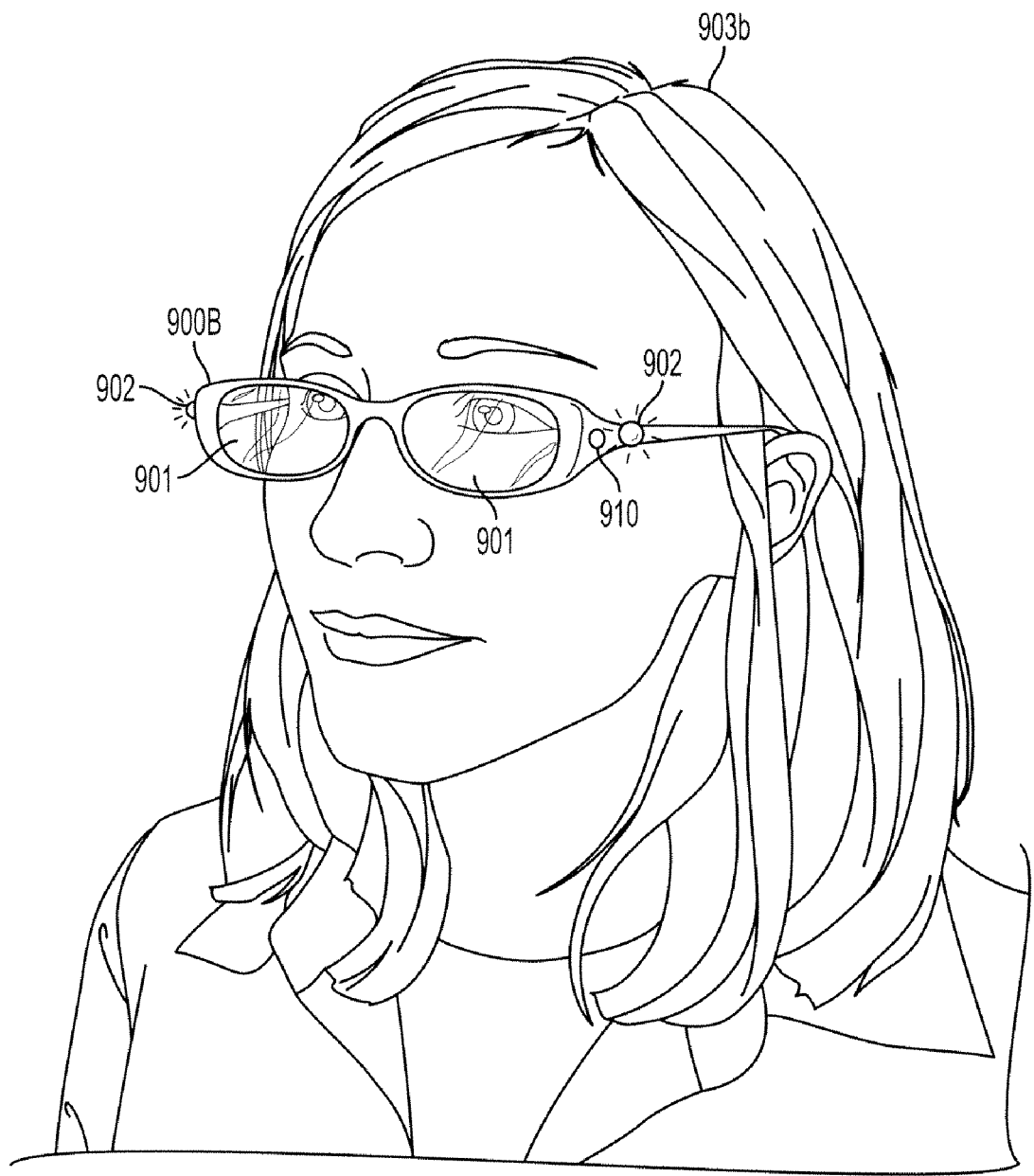
Figure 23C:
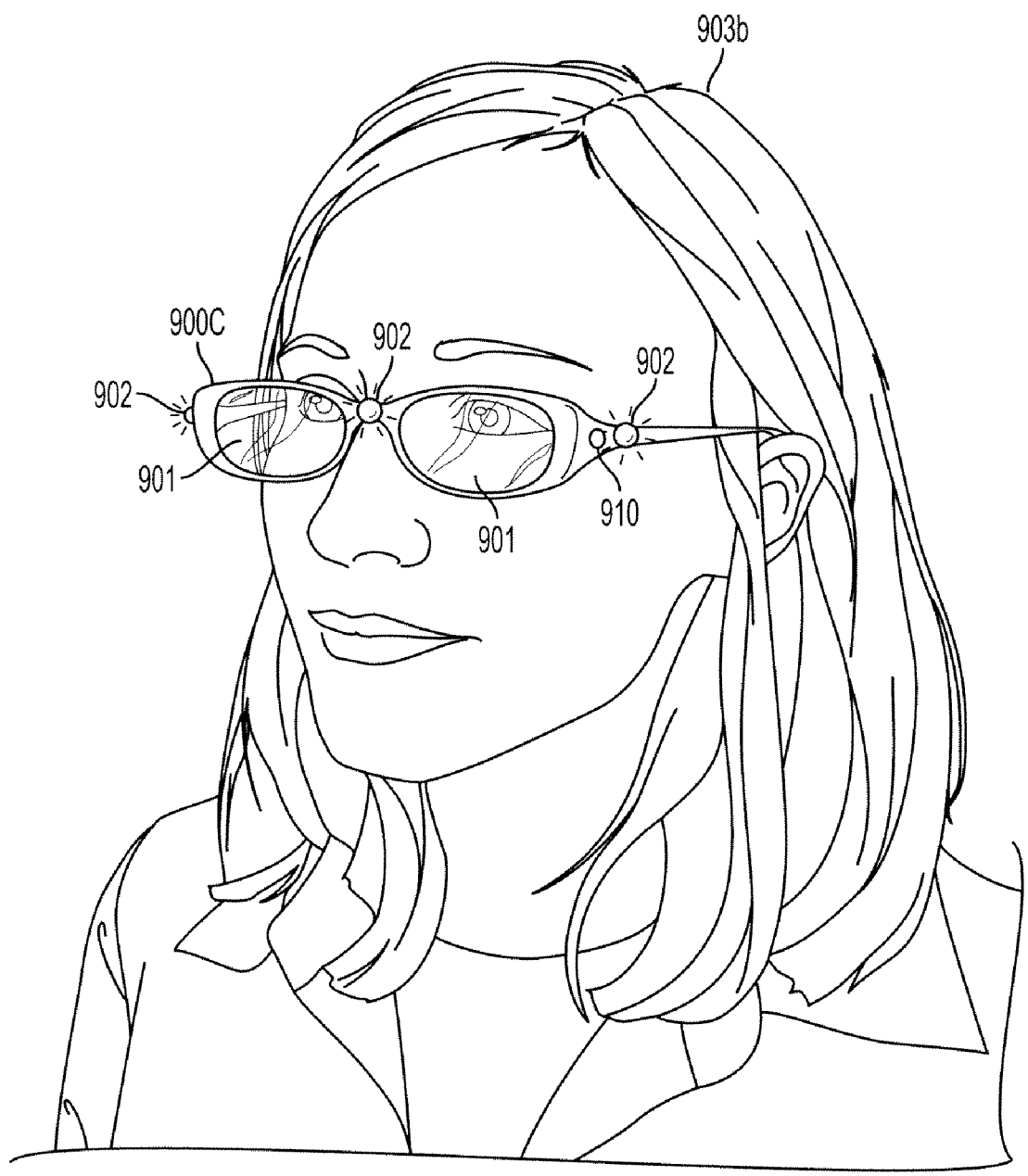
Figure 23D:
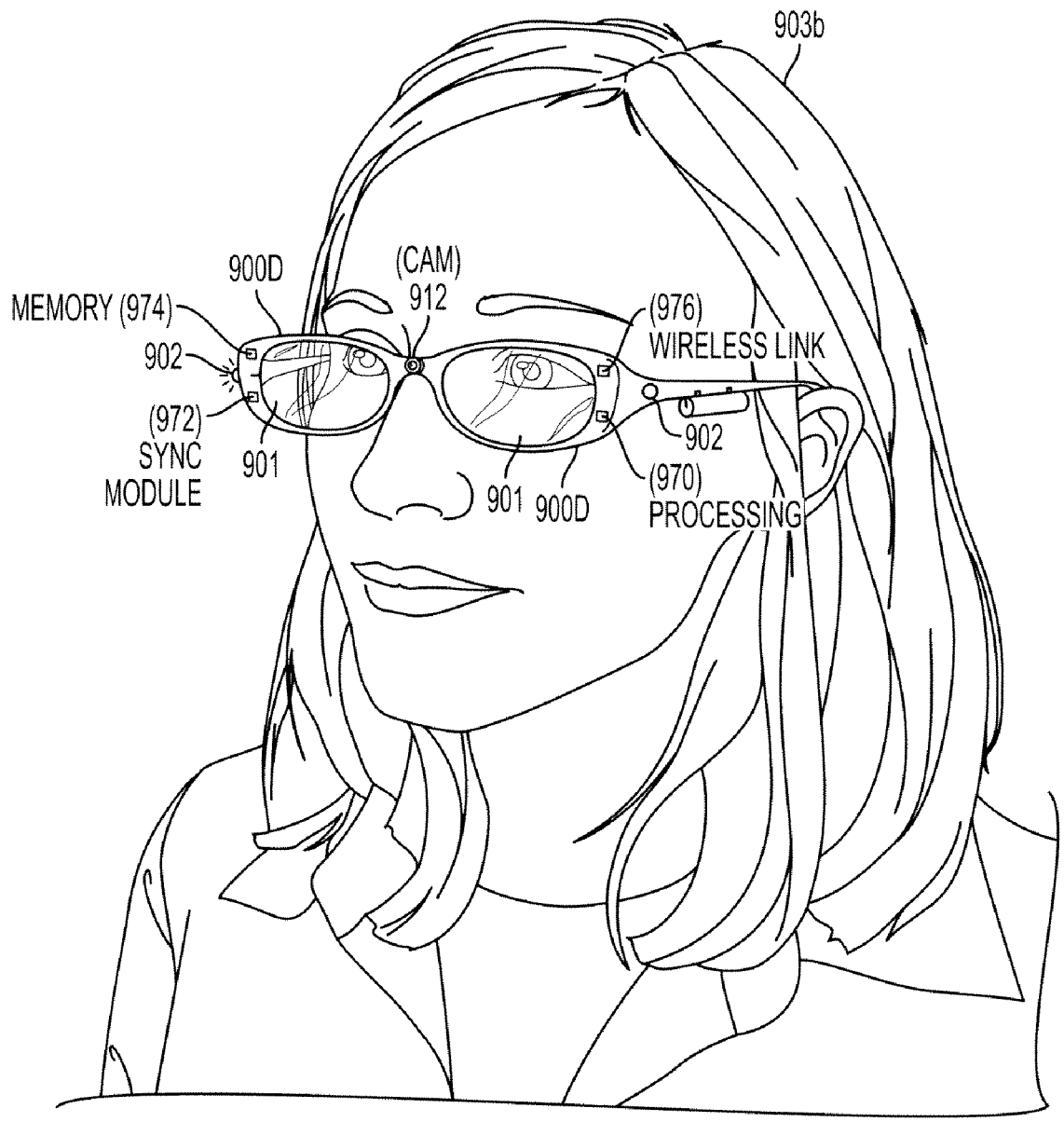
Figure 23E:
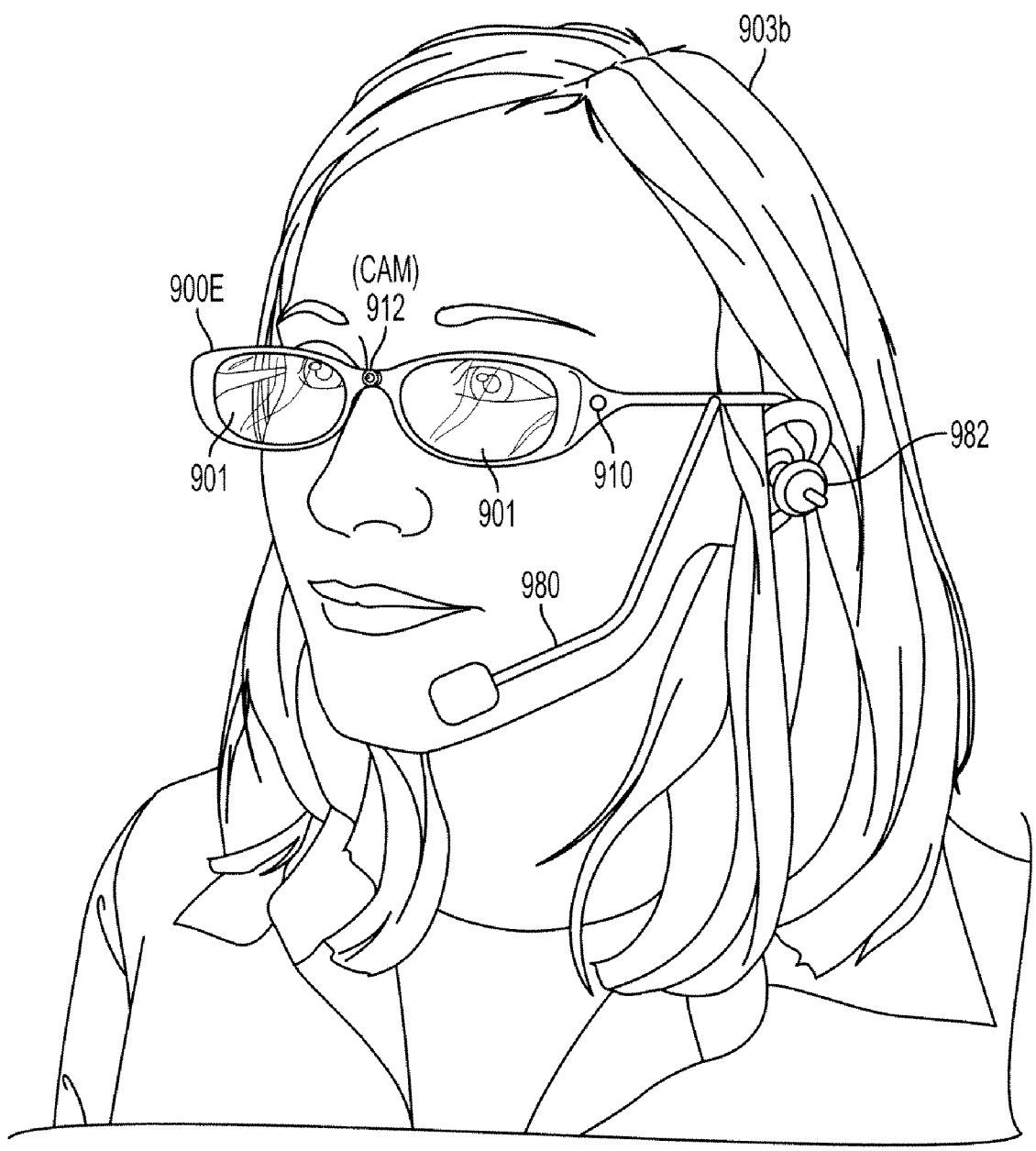

FIG. 23B illustrates user 903b wearing an alternate pair of glasses 900B. Glasses 900B illustrate lights 902 positioned at each side of glasses 900B, so as to provide two points for tracking by camera 952 of the computing console 950. Circuit 910 is also integrated within glasses 900B. By providing two lights 902, it is possible to detect tilts, roll, yaw, as well as depth as camera 952 detects the lights 902. When users approach the screen proximate to camera 952, lights 902 will appear spread apart, while when user 903b moves away from the screen and camera 952, lights 902 will appear to move closer to one another on the captured pixel data. Consequently, depth (i.e., position of the glasses relative to the screen) data can be more accurately detected by using at least two lights 902 integrated at some location with a minimum separation on glasses 900. FIG. 23C shows an example of three lights 902. FIG. 23D shows an example of various modules integrated into the frame of glasses 901. FIG. 23E shows an example of a microphone and ear piece connected to the glasses.

Referring back to FIG. 25, the example shows three users having views A, B, and C. As explained, as more users join, the frequency is divided down, based on the number of users. In FIG. 25, when all three users a viewing the screen, the frames per second displayed to a particular user goes down. For instance, when the rate is 120 fps, the three users would cause the rate to go down to 40 fps, each. In alternate embodiments, certain users can have high priority, and more frame rates can be given to those users. However, in an even sharing mode, each of the three will get 40 fps. When the fps goes down, the brightness can possible decrease. To address this problem, the an embodiment provides for boosting of the brightness.

Brightness boosting can be done to simulate the screen staying at the high frame rate of 120 fps, i.e., as if only one user was watching. In still another embodiment, frame rate boosting can occur dynamically, such that users can come in and out of a scene, and by detecting if the user is watching/viewing the screen, the frame rate can be dynamically adjusted. For instance, if user having View C starts to look away, the views A and B would get a boost in fps, from 40 fps to 60 fps. Additionally, the brightness boost would be adjusted down, as the higher frame rate of 60 fps would provide more brightness. Thus, by tracking the users and determining in real time if users are viewing the screen, the screen can auto adjust up and down in frame rate dedicated to each user as well as adjusting the brightness boost provided during the mode changes. In one embodiment, mode switching is triggered by the multiplexing of views among users that join or leave a particular session or viewing area, as detected by the dynamic tracking. The boosting can also be adjusted based on a dedicated gearing, such that users having particular privileges are provided more frame rates or more brightness. Consequently, the adjustments can be made based on a predetermined rule, rate, availability or rank.

In view of the above, the glasses 900 having the tracking and feedback data can assist in providing more dynamic display and interaction with video presentations of 2D or 3D.

III. Hardware and Software Configurations

Figure 26:
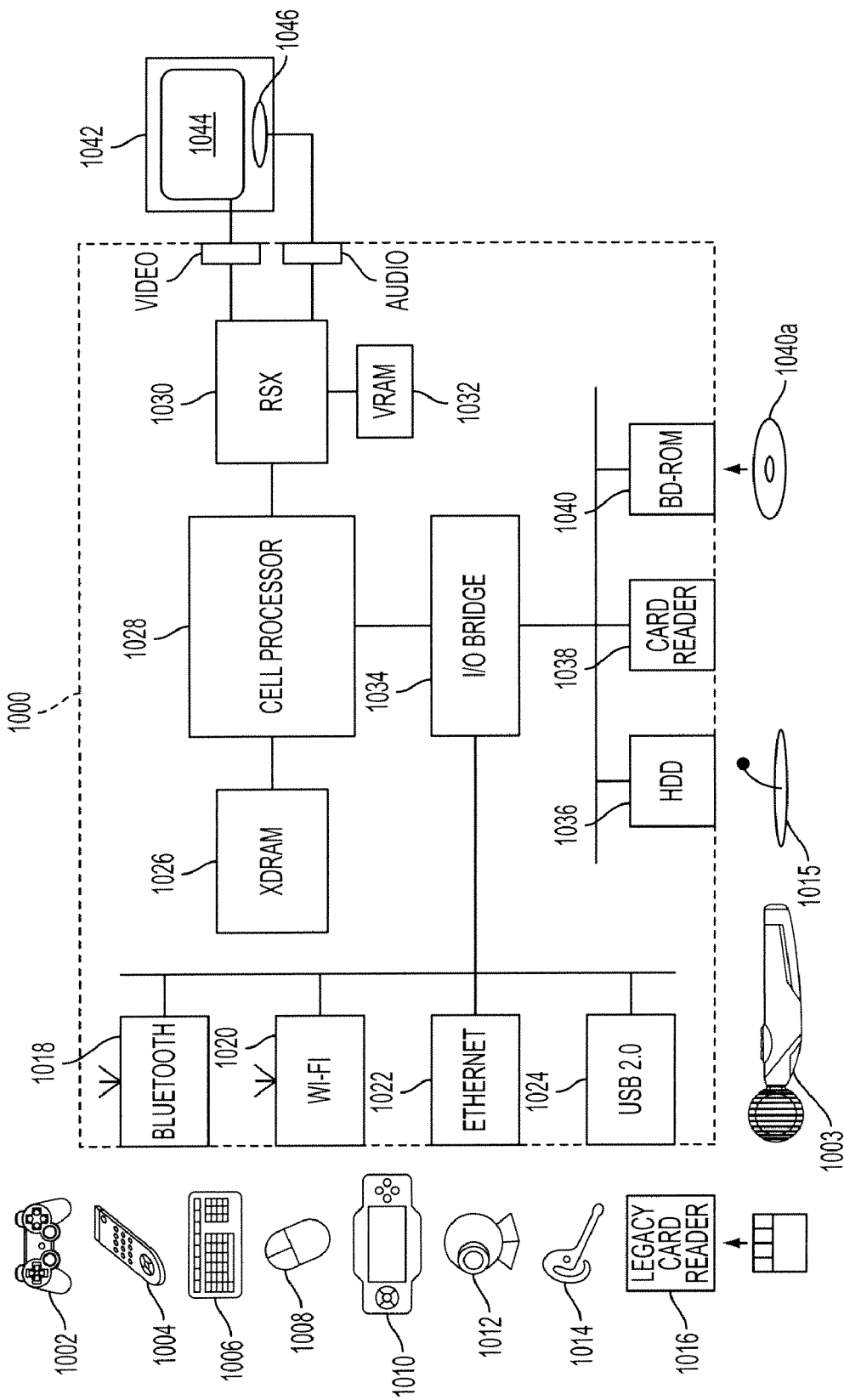
FIG. 26 illustrates hardware and user interfaces that may be used to determine controller location, in accordance with one embodiment of the present invention.

FIG. 26 schematically illustrates the overall system architecture of the Sony® Playstation 3® entertainment device, a game console that may be compatible for implementing a three-dimensional controller in accordance with one embodiment of the present invention. A system unit 1000 is provided, with various peripheral devices connectable to the system unit 1000. The system unit 1000 comprises: a Cell processor 1028; a Rambus® dynamic random access memory (XDRAM) unit 1026; a Reality Synthesizer graphics unit 1030 with a dedicated video random access memory (VRAM) unit 1032; and an I/O bridge 1034. The system unit 1000 also comprises a Blu Ray® Disk BD-ROM® optical disk reader 1040 for reading from a disk 1040a and a removable slot-in hard disk drive (HDD) 1036, accessible through the I/O bridge 1034. Optionally the system unit 1000 also comprises a memory card reader 1038 for reading compact flash memory cards, Memory Stick® memory cards and the like, which is similarly accessible through the I/O bridge 1034.

The I/O bridge 1034 also connects to six Universal Serial Bus (USB) 2.0 ports 1024; a gigabit Ethernet port 1022; an IEEE 802.11b/g wireless network (Wi-Fi) port 1020; and a Bluetooth® wireless link port 1018 capable of supporting of up to seven Bluetooth connections.

In operation, the I/O bridge 1034 handles all wireless, USB and Ethernet data, including data from one or more game controllers 1002 and 1003. For example when a user is playing a game, the I/O bridge 1034 receives data from the game controller 1002 or 1003 via a Bluetooth link and directs it to the Cell processor 1028, which updates the current state of the game accordingly.

The wireless, USB and Ethernet ports also provide connectivity for other peripheral devices in addition to game controllers 1002 and 1003, such as: a remote control 1004; a keyboard 1006; a mouse 1008; a portable entertainment device 1010 such as a Sony Playstation Portable® entertainment device; a video camera such as an EyeToy® video camera 1012; a microphone headset 1014. Such peripheral devices may therefore in principle be connected to the system unit 1000 wirelessly; for example the portable entertainment device 1010 may communicate via a Wi-Fi ad-hoc connection, whilst the microphone headset 1014 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1016 may be connected to the system unit via a USB port 1024, enabling the reading of memory cards of the kind used by the Playstation® or Playstation 2® devices.

In the present embodiment, the game controllers 1002 and 1003 are operable to communicate wirelessly with the system unit 1000 via the Bluetooth link. However, the game controllers 1002 and 1003 can instead be connected to a USB port, thereby also providing power by which to charge the battery of the game controllers 1002 and 1003. Game controllers 1002 and 1003 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1002 is a controller designed to be used with two hands and game controller 1003 is multi-positional controller as previously described. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1004 is also operable to communicate wirelessly with the system unit 1000 via a Bluetooth link. The remote control 1004 comprises controls suitable for the operation of the Blu Ray™ Disk BD-ROM reader 1040 and for the navigation of disk content.

The Blu Ray™ Disk BD-ROM reader 1040 is operable to read CD-ROMs compatible with the Playstation and PlayStation 2 devices, in addition to conventional pre-recorded and recordable CDs, and so-called Super Audio CDs. The reader 1040 is also operable to read DVD-ROMs compatible with the Playstation 2 and PlayStation 3 devices, in addition to conventional pre-recorded and recordable DVDs. The reader 1040 is further operable to read BD-ROMs compatible with the Playstation 3 device, as well as conventional pre-recorded and recordable Blu-Ray Disks.

The system unit 1000 is operable to supply audio and video, either generated or decoded by the Playstation 3 device via the Reality Synthesizer graphics unit 1030, through audio and video connectors to a display and sound output device 1042 such as a monitor or television set having a display 1044 and one or more loudspeakers 1046. The audio connectors may include conventional analogue and digital outputs whilst the video connectors may variously include component video, S-video, composite video and one or more High Definition Multimedia Interface (HDMI) outputs or DisplayPort outputs. Consequently, video output may be in formats such as PAL or NTSC, or in 720p, 1080i or 1080p high definition.

Audio processing (generation, decoding and so on) is performed by the Cell processor 1028. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1012 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1000. The camera LED indicator is arranged to illuminate in response to appropriate control data from the system unit 1000, for example to signify adverse lighting conditions. Embodiments of the video camera 1012 may variously connect to the system unit 1000 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1000, an appropriate piece of software such as a device driver should be provided. Device driver technology is well-known and will not be described in detail here, except to say that the skilled man will be aware that a device driver or similar software interface may be required in the present embodiment described.

Figure 27:
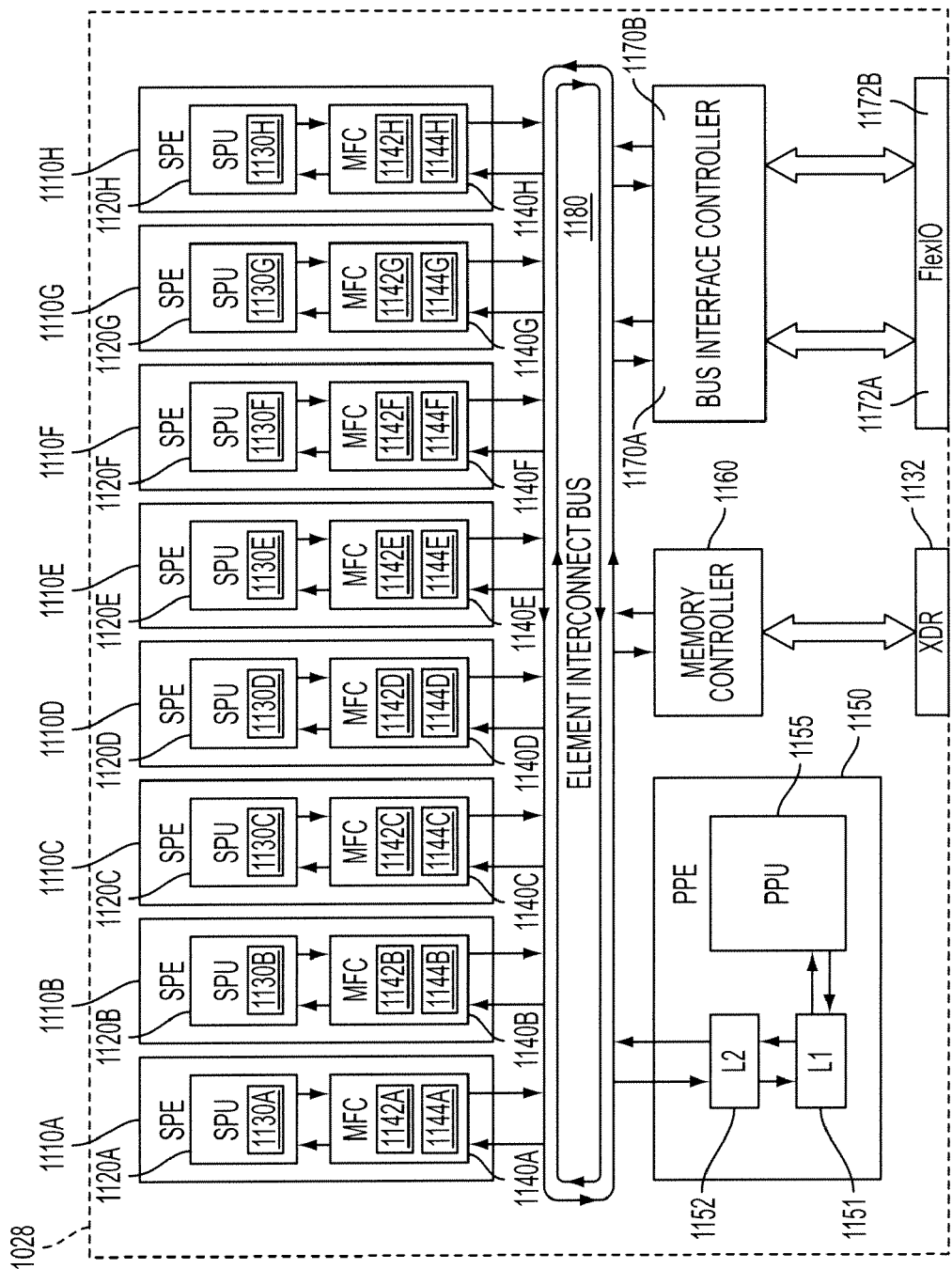
FIG. 27 illustrates additional hardware that may be used to process instructions, in accordance with one embodiment of the present invention.

FIG. 27 illustrates additional hardware that may be used to process instructions, in accordance with one embodiment of the present invention. Cell processor 1028 has an architecture comprising four basic components: external input and output structures comprising a memory controller 1160 and a dual bus interface controller 1170A, B; a main processor referred to as the Power Processing Element 1150; eight co-processors referred to as Synergistic Processing Elements (SPEs) 1110A-H; and a circular data bus connecting the above components referred to as the Element Interconnect Bus 1180. The total floating point performance of the Cell processor is 218 GFLOPS, compared with the 6.2 GFLOPs of the Playstation 2 device's Emotion Engine.

The Power Processing Element (PPE) 1150 is based upon a two-way simultaneous multithreading Power 1470 compliant PowerPC core (PPU) 1155 running with an internal clock of 3.2 GHz. It comprises a 512 kB level 2 (L2) cache and a 32 kB level 1 (L1) cache. The PPE 1150 is capable of eight single position operations per clock cycle, translating to 25.6 GFLOPs at 3.2 GHz. The primary role of the PPE 1150 is to act as a controller for the Synergistic Processing Elements 1110A-H, which handle most of the computational workload. In operation the PPE 1150 maintains a job queue, scheduling jobs for the Synergistic Processing Elements 1110A-H and monitoring their progress. Consequently each Synergistic Processing Element 1110A-H runs a kernel whose role is to fetch a job, execute it and synchronized with the PPE 1150.

Each Synergistic Processing Element (SPE) 1110A-H comprises a respective Synergistic Processing Unit (SPU) 1120A-H, and a respective Memory Flow Controller (MFC) 1140A-H comprising in turn a respective Dynamic Memory Access Controller (DMAC) 1142A-H, a respective Memory Management Unit (MMU) 1144A-H and a bus interface (not shown). Each SPU 1120A-H is a RISC processor clocked at 3.2 GHz and comprising 256 kB local RAM 1150A-H, expandable in principle to 4 GB. Each SPE gives a theoretical 25.6 GFLOPS of single precision performance. An SPU can operate on four single precision floating point members, four 32-bit numbers, eight 16-bit integers, or sixteen 8-bit integers in a single clock cycle. In the same clock cycle it can also perform a memory operation. The SPU 1120A-H does not directly access the system memory XDRAM 1126; the 64-bit addresses formed by the SPU 1120A-H are passed to the MFC 1140A-H which instructs its DMA controller 1142A-H to access memory via the Element Interconnect Bus 1180 and the memory controller 1160.

The Element Interconnect Bus (EIB) 1180 is a logically circular communication bus internal to the Cell processor 1028 which connects the above processor elements, namely the PPE 1150, the memory controller 1160, the dual bus interface 1170A,B and the eight SPEs 1110A-H, totaling 12 participants. Participants can simultaneously read and write to the bus at a rate of eight bytes per clock cycle. As noted previously, each SPE 1110A-H comprises a DMAC 1142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1160 comprises an XDRAM interface 1162, developed by Rambus Incorporated. The memory controller interfaces with the Rambus XDRAM 1126 with a theoretical peak bandwidth of 25.6 GB/s.

The dual bus interface 1170A,B comprises a Rambus FlexIO® system interface 1172A,B. The interface is organized into 12 channels each being eight bits wide, with five paths being inbound and seven outbound. This provides a theoretical peak bandwidth of 62.4 GB/s (36.4 GB/s outbound, 26 GB/s inbound) between the Cell processor and the I/O Bridge 1034 via controller 1170A and the Reality Simulator graphics unit 1030 via controller 1170B.

Data sent by the Cell processor 1028 to the Reality Simulator graphics unit 1030 will typically comprise display lists, being a sequence of commands to draw vertices, apply textures to polygons, specify lighting conditions, and so on. Moreover, embodiments of the present invention provide real-time interactive gaming experiences for users. For example, users can interact with various computer-generated objects in real-time. Furthermore, video scenes can be altered in real-time to enhance the user's game experience.

IV. Distributed Processing—Cloud Computing

Figure 28:
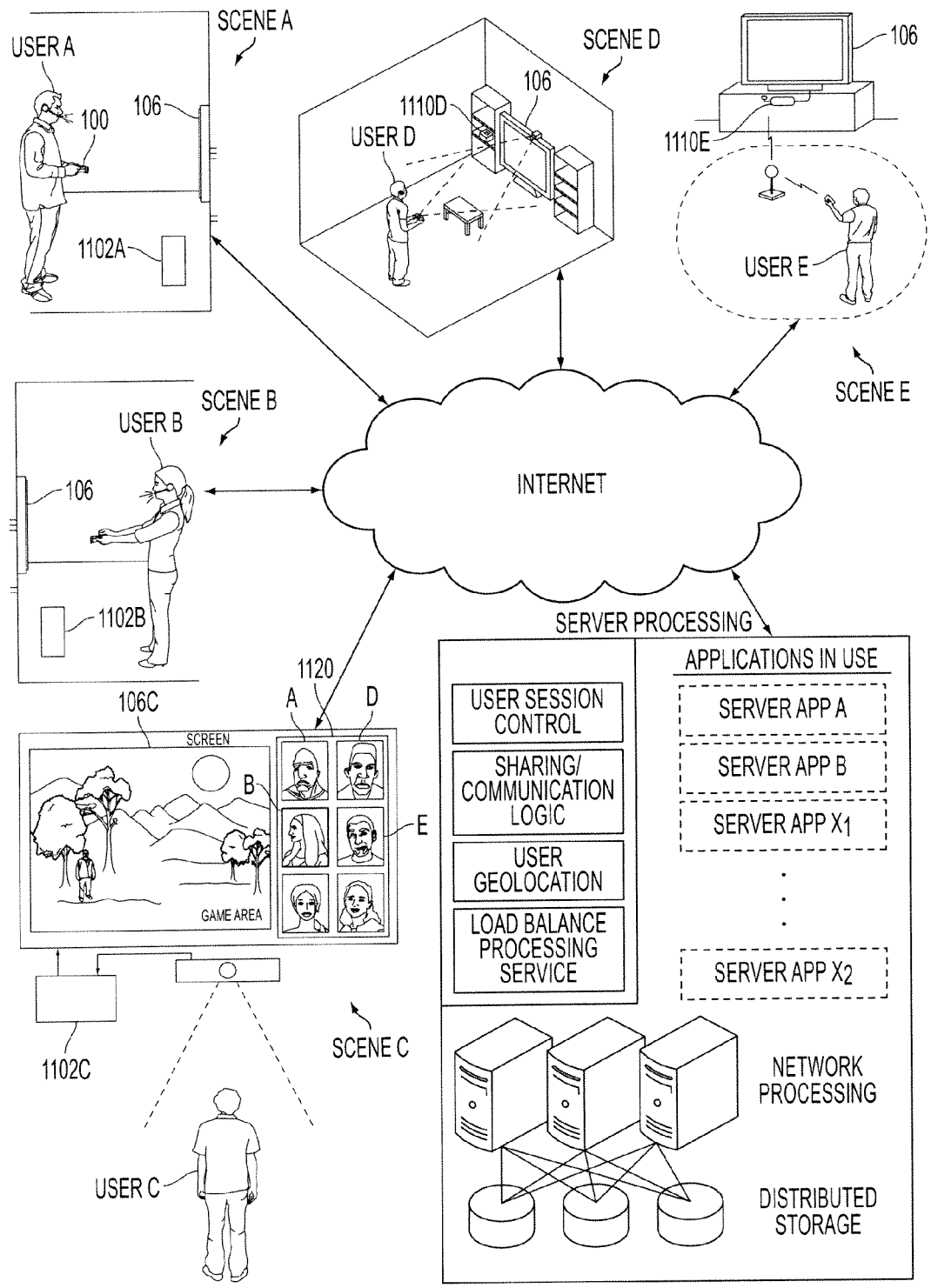
FIG. 28 is an exemplary illustration of scene A through scene E with respective user A through user E interacting with game clients that are connected to server processing via the internet, in accordance with one embodiment of the present invention.

FIG. 28 is an exemplary illustration of scene A through scene E with respective user A through user E interacting with game clients 1102 that are connected to server processing via the internet, in accordance with one embodiment of the present invention. As previously discussed, a game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 28, user A interacts with a client application displayed on a monitor 106 using a controller 100 paired with game client 1102A. Similarly, within scene B, user B interacts with another client application that is displayed on monitor 106 using a controller 100 paired with game client 1102B. Scene C illustrates a view from behind user C as he looks at a monitor displaying a game and buddy list from the game client 1102C. While FIG. 11 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 28, the server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 106C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. An apparatus for interfacing with a display screen, comprising:
a frame including,
(a) a pair of shutter lenses,
(b) a light coupled to the frame;
(b) a circuit integrated with the frame to control the pair of shutter lenses and control the light coupled to the frame, the circuit configured to communicate with a display device to enable synchronization of the shutter lenses and the display device, the light being analyzed to determine position of the frame relative to the display device, the position being used to cause an adjustment in display output when viewed from a perspective of the position of the frame, the circuit further configured to apply a gearing ratio that modifies the adjustment in the display output, the gearing ratio is configured to change over time based on the determined position of the frame and content being presented on the display device.

2. The apparatus for interfacing with a display screen as recited in claim 1, wherein the frame is for eye glasses, and the pair of shutter glasses are coupled to the frame.

3. The apparatus for interfacing with a display screen as recited in claim 1, wherein the light is defined by two lights coupled to the frame, in a spaced apart orientation.

4. The apparatus for interfacing with a display screen as recited in claim 3, wherein the adjustment in display output is performed to optimize a parallax view from the position, based on an angle detected from the two light that are analyzed from the frame.

5. The apparatus for interfacing with a display screen as recited in claim 1, wherein the circuit obtains input for inertial movement of the frame.

6. The apparatus for interfacing with a display screen as recited in claim 1, wherein the gearing ratio identifies an input value that is corresponded to a state of interaction with a program being rendered on the display.

7. The apparatus for interfacing with a display screen as recited in claim 6, wherein the state of interaction includes passive viewing, or viewing while moving, or viewing while interfacing, or viewing while driving game interactivity.

8. The apparatus for interfacing with a display screen as recited in claim 1, wherein the frame includes a camera.

9. The apparatus for interfacing with a display screen as recited in claim 1, wherein the frame includes a wireless transmitter.

10. The apparatus for interfacing with a display screen as recited in claim 1, wherein the circuit includes a digital signal processor that is coupled to a tracking module, a shutter filter control, an inertial sensor, a sync module and a light control.

11. An apparatus for interfacing with a display screen, comprising: a frame including,
(a) a pair of shutter lenses,
(b) a light coupled to the frame;
(b) a circuit integrated with the frame to control the pair of shutter lenses and control the light coupled to the frame, the circuit configured to communicate with a display device to enable synchronization of the shutter lenses and the display device, the light being analyzed to determine position of the frame relative to the display device, the position being used to cause an adjustment in display output when viewed from a perspective of the position of the frame wherein the circuit includes a mixer for modulating inputs, and the mixer provides a input to a parallax optimizer, the input being selective based on a scene being rendered on the display.

12. The apparatus of claim 11, wherein the modulated inputs receive data from two or more of a gearing input, a tracking input, an inertial data input, or a program feedback input.

13. The apparatus of claim 11, wherein the light is defined by two lights coupled to the frame, in a spaced apart orientation.

14. That apparatus of claim 13, wherein the two lights provide data for depth and orientation relative to the display device.

15. The apparatus of claim 13, wherein the adjustment in display output is performed to optimize a parallax view from the position, based on an angle detected from the two light that are analyzed from the frame.

16. A pair of glasses for viewing content formatted for viewing three-dimensional content on a display screen, comprising:
glasses frames that include a pair of shutter lenses and a pair of lights coupled to outer edges of the glasses frames, the glasses frames further including a circuit for controlling the pair of shutter lenses and controlling the pair of lights, the circuit configured to communicate with circuitry associated with the display device to enable synchronization of the shutter lenses and the display device, the pair of lights being image analyzed to determine position of the glasses frames relative to the display device, the position being used as an input to cause an adjustment in display output when viewed from a perspective of the position of the frame, and the circuit includes a mixer for receiving inputs concerning the determined position and a gearing ratio, the mixer configured to blend the inputs concerning the determined position and the gearing ratio, the blending of the inputs is based on display content being viewed on the display screen through the shutter lenses of the glasses frames, the blended inputs provided to adjust the display screen while the display content is being rendered, and the circuit acting to continuously update the blended inputs over time as the display content is rendered and changes.

17. The pair of glasses of claim 16, further comprising, a microphone for receiving audio input.

* * * * *